United States Patent
Lee et al.

(10) Patent No.: US 10,833,796 B2
(45) Date of Patent: Nov. 10, 2020

(54) METHOD AND APPARATUS FOR COMPETITION-BASED TRANSMITTING OF UPLINK DATA IN WIRELESS COMMUNICATION SYSTEM TO WHICH NON-ORTHOGONAL MULTIPLE ACCESS SCHEME IS APPLIED

(71) Applicant: LG ELECTRONICS INC., Seoul (KR)

(72) Inventors: Hojae Lee, Seoul (KR); Kijun Kim, Seoul (KR); Byounghoon Kim, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 16/301,718

(22) PCT Filed: Apr. 25, 2017

(86) PCT No.: PCT/KR2017/004353
§ 371 (c)(1),
(2) Date: Nov. 14, 2018

(87) PCT Pub. No.: WO2017/204471
PCT Pub. Date: Nov. 30, 2017

(65) Prior Publication Data
US 2019/0305877 A1   Oct. 3, 2019

Related U.S. Application Data

(60) Provisional application No. 62/341,078, filed on May 25, 2016, provisional application No. 62/369,759, filed on Aug. 2, 2016.

(51) Int. Cl.
*H04L 1/00* (2006.01)
*H04W 74/00* (2009.01)
(Continued)

(52) U.S. Cl.
CPC .......... *H04L 1/0004* (2013.01); *H04L 5/0005* (2013.01); *H04W 74/00* (2013.01);
(Continued)

(58) Field of Classification Search
None
See application file for complete search history.

(56) References Cited

U.S. PATENT DOCUMENTS

2013/0201857 A1* 8/2013 Bhargava ............... H04K 3/222
370/252
2015/0312074 A1  10/2015 Zhu et al.
(Continued)

OTHER PUBLICATIONS

PCT International Application No. PCT/KR2017/004353, International Search Report dated Jul. 27, 2017, 4 pages.
(Continued)

*Primary Examiner* — Jay L Vogel
(74) *Attorney, Agent, or Firm* — Lee Hong Degerman Kang Waimey

(57) ABSTRACT

Provided are a method and an apparatus for competition-based transmitting of uplink data in a wireless communication system to which a non-orthogonal multiple access scheme is applied. Particularly, a terminal receives, from a base station, information relating to a predefined modulation pattern for non-orthogonal multiple access. The information relating to the predefined modulation pattern includes a modulation pattern index. The modulation pattern index indicates designation of a terminal-specific modulation order for each resource element in a resource used overlappingly by multiple terminals. The terminal transmits data to the base station using the modulation order designated to each of the resource elements on the basis of the information relating to the predetermined modulation pattern.

10 Claims, 31 Drawing Sheets

(51) Int. Cl.
*H04W 76/27* (2018.01)
*H04L 5/00* (2006.01)
*H04W 74/08* (2009.01)
*H04W 88/02* (2009.01)
*H04L 27/34* (2006.01)

(52) U.S. Cl.
CPC .......... *H04W 74/08* (2013.01); *H04W 76/27* (2018.02); *H04W 88/02* (2013.01)

(56) References Cited

U.S. PATENT DOCUMENTS

| | | |
|---|---|---|
| 2016/0100413 A1 | 4/2016 | Hwang et al. |
| 2016/0112995 A1 | 4/2016 | Chen |
| 2016/0142193 A1 | 5/2016 | Benjebbour et al. |
| 2017/0251517 A1* | 8/2017 | Kimura ................ H04W 52/30 |
| 2017/0288928 A1* | 10/2017 | Xu ........................ H04W 72/12 |
| 2017/0289979 A1* | 10/2017 | Xu ........................ H04J 11/0023 |

OTHER PUBLICATIONS

Linglong Dai et al., "Non-orthogonal multiple access for 5G: solutions, challenges, opportunities, and future research trends", IEE Communications Magazine, vol. 53, Issue 9, pp. 74-81, Sep. 2015, 10 pages.

* cited by examiner block interpolation linear interpolation non-linear interpolation (a) reference signal hopping pattern 0

(b) reference signal hopping pattern 1

METHOD AND APPARATUS FOR COMPETITION-BASED TRANSMITTING OF UPLINK DATA IN WIRELESS COMMUNICATION SYSTEM TO WHICH NON-ORTHOGONAL MULTIPLE ACCESS SCHEME IS APPLIED

CROSS-REFERENCE TO RELATED APPLICATIONS

This application is the National Stage filing under 35 U.S.C. 371 of International Application No. PCT/KR2017/004353, filed on Apr. 25, 2017, which claims the benefit of U.S. Provisional Application No. 62/341,078, filed on May 25, 2016, and 62/369,759, filed on Aug. 2, 2016, the contents of which are all hereby incorporated by reference herein in their entirety.

BACKGROUND OF THE INVENTION

Field of the Invention

The present specification relates to wireless communication, and more particularly, to a method and apparatus for contention-based transmission of uplink data in a wireless communication system to which a non-orthogonal multiple access scheme is applied.

Related Art

A wireless communication system is widely deployed to provide various types of communication services, such as voice and data. An object of a wireless communication system is to enable a plurality of UEs to perform reliable communication regardless of their locations and mobility.

In general, a wireless communication system is a multiple access system capable of supporting communication with a plurality of UEs by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A requirement of a next-generation wireless communication system is to accommodate significantly explosive data traffic, to increase a dramatic increase in a transfer rate per user, to accommodate the significantly increased number of connected devices, and to support a very low end-to-end (E2E) latency and high energy efficiency. For this, there is ongoing research on various techniques such as dual connectivity, massive multiple input multiple output (MIMO), in-band full duplex, non-orthogonal multiple access (NOMA), super wideband support, device networking, or the like.

SUMMARY OF THE INVENTION

The present specification proposes a method and apparatus for contention-based transmission of uplink data in a wireless communication system to which a non-orthogonal multiple access scheme is applied.

The present specification proposes a method and apparatus for contention-based transmission of uplink data in a wireless communication system to which a non-orthogonal multiple access scheme is applied.

The apparatus includes a radio frequency (RF) unit transmitting and receiving a radio signal.

A user equipment (UE) receives information regarding a predefined modulation pattern for non-orthogonal multiple access from a base station. The information regarding the predefined modulation pattern includes a modulation pattern index. The modulation pattern index indicates that a modulation order is designated in a UE-specific manner for each resource element in a resource used by multiple UEs in an overlapping manner.

That is, for each UE, the modulation order is designated with respect to each resource element. In addition, the modulation pattern for each resource element may vary for each modulation pattern index. However, even if the modulation pattern varies for each resource element, data transmitted by the multiple UEs has the same data rate.

In addition, the modulation pattern index may further indicate that a specific resource element in the resource used by the multiple UEs in an overlapping manner is nulled in a UE-specific manner. That is, the nulling of the specific resource element in a modulation pattern for each resource element used for each UE may mean that interference between the UEs can be cancelled by transmitting a null symbol instead of transmitting a modulation symbol in the specific resource element.

An expected value of power and variance value of power with respect to multiuser interference (MUI) of each of the resource elements may vary depending on a modulation order (or modulation pattern) designated for each of the resource elements. The presence of the power variance value for the MUI means that an amount of interference between UEs may not be constant but be variable. Lower reliability may be provided when the amount of interference between UEs is greater than a specific value, and higher reliability may be provided when the amount of interference between UEs is less than the specific value. Accordingly, since high reliability is provided to a high modulation order, reliability for more information bits is provided, thereby increasing reliability of the entire data.

The UE transmits data to the base station by using the modulation order designated to each of the resource elements on the basis of the information regarding the predefined modulation pattern. The UE may transmit data with a hierarchical modulation order for each resource element in a resource used by the multiple UEs in an overlapping manner.

In addition, the UE may select a modulation pattern index for the UE from the modulation pattern indices. In addition, the base station may predefine a modulation pattern index for the UE, and may report it through RRC signaling. The data may be modulated by a modulation order designated by each of the resource element indicated by a modulation pattern index for the UE. In addition, the modulation pattern index may be received through a control channel (e.g., PDCCH).

In addition, the UE may receive information regarding a predefined coding rate pattern for the non-orthogonal multiple access from the base station. The information regarding the predefined coding rate pattern may include a coding rate pattern index. The coding rate pattern index may indicate that a coding rate is designated in a UE-specific manner for each resource element in a resource used by multiple UEs in an overlapping manner.

The UE may select a coding rate pattern index for the UE from the coding rate pattern indices. In addition, the base station may redefine a coding rate pattern index for the UE, and may report it through RRC signaling. The data may be encoded by a coding rate designated for each of the resource elements indicated by the coding rate pattern index for the UE.

In addition, the UE may receive information regarding a predefined codeword for non-orthogonal multiple access from the base station. The modulation pattern index may be designated based on an index of the predefined codeword. The coding rate pattern index may be designated based on the index of the predefined codeword. That is, the codeword index may be predefined by being tied to a UE-specific modulation pattern index or a coding rate pattern index. Therefore, the base station may verify a modulation pattern or a coding rate pattern on the basis of a codeword index when performing blind detection.

In addition, information regarding the predefined modulation pattern and information regarding the predefined coding rate pattern may be broadcast to all UEs in a cell in a look-up table manner.

When the proposed scheme is used, since an expected value and variance value of interference may vary for each UE pair according to a UE-specific modulation pattern of each user, diversity can be obtained in terms of interference while an interleaved coded bit stream is modulated. In addition, a UE can obtain a different coding gain for each section of an information bit according to a UE-specific coding pattern of each user. Then, diversity can be obtained in terms of interference by a UE-specific bit interleaver or the like. Therefore, a level of the interference can be exhibited in various patterns with respect to the information bit by the UE-specific interleaver. In this manner, MUD performance of a receiver can be increased through interference distribution for multi-user overlapping transmission.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
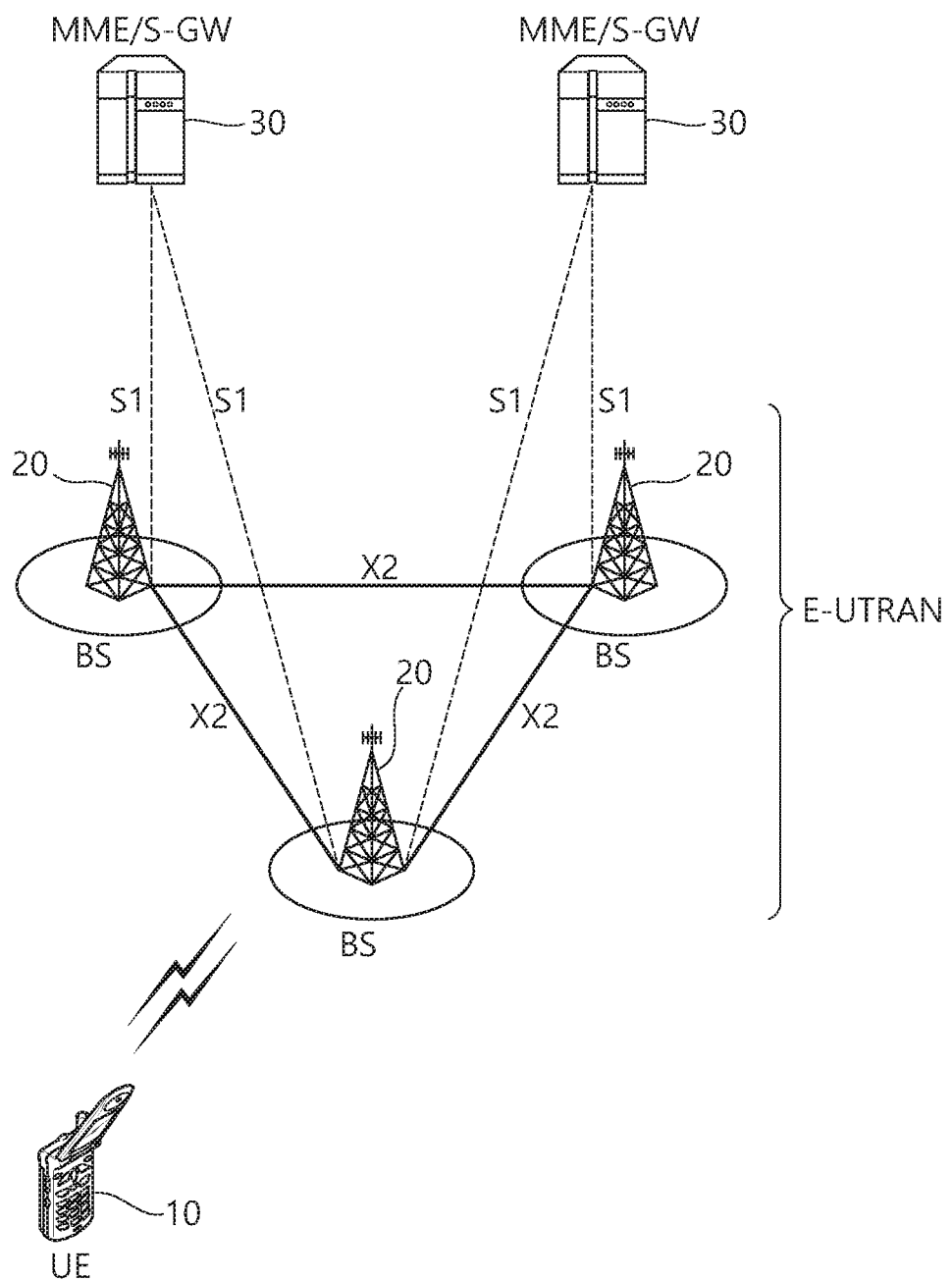
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
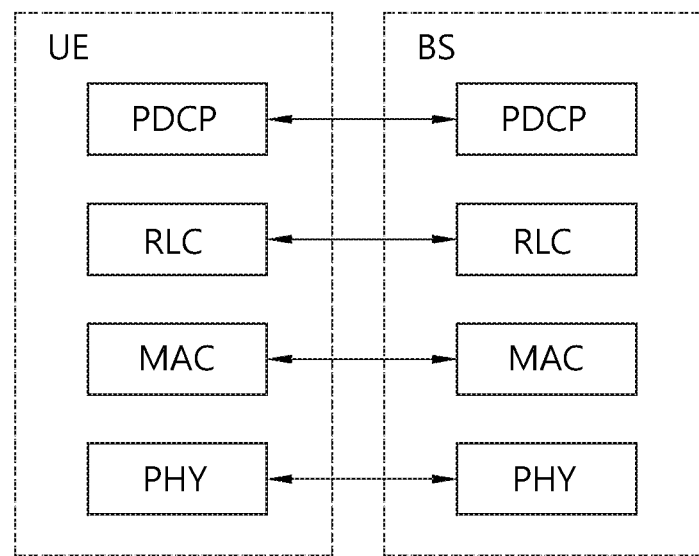
FIG. 2 is a diagram illustrating a radio protocol architecture for a user plane.
Figure 3:
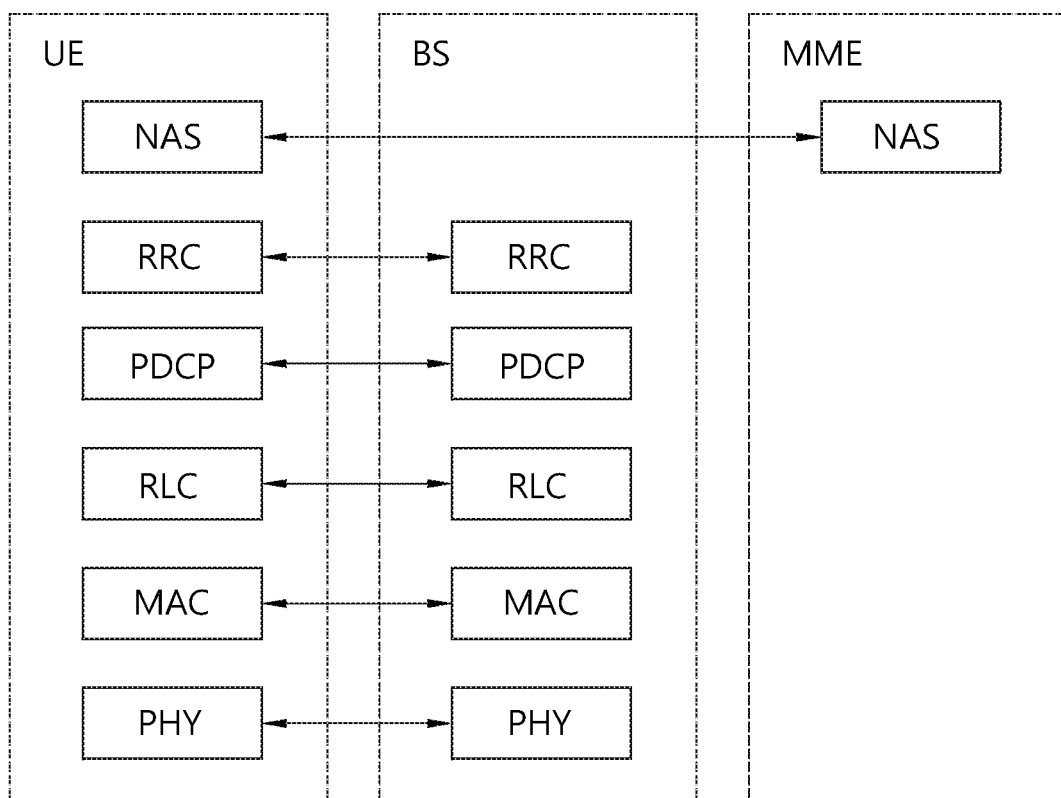
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
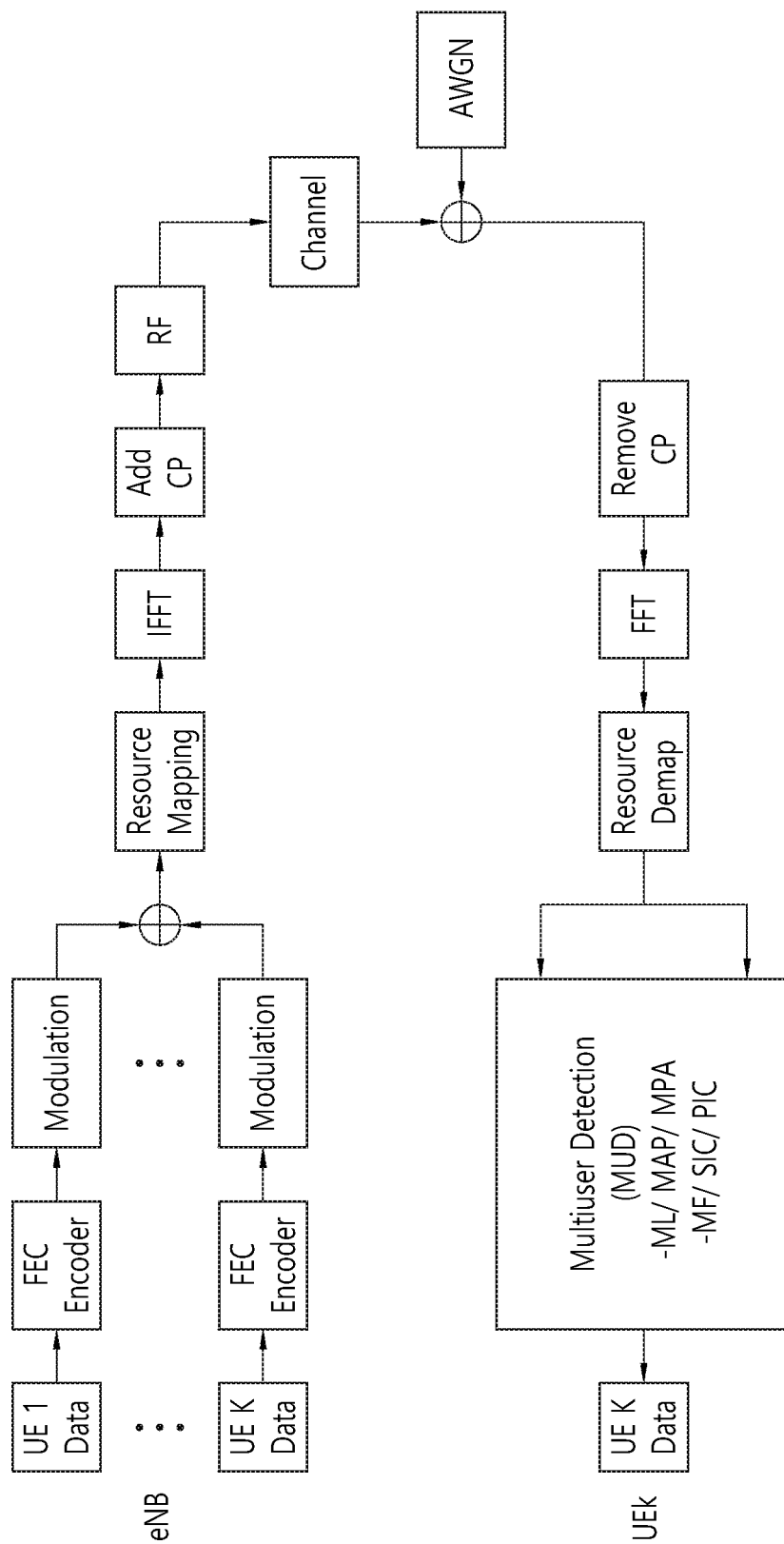
FIG. 4 is a block diagram illustrating NOMA based downlink transmission/reception (Tx/Rx) of a communication apparatus.

FIG. 4 is a block diagram illustrating NOMA based downlink transmission/reception (Tx/Rx) of a communication apparatus.

In a Non-orthogonal Coded Multiple Access (NCMA) scheme for transmitting multi-UE (or multi-user) information by allocating the multi-UE information to the same resource, a transmitter and receiver structure for downlink support as shown in FIG. 4 is general. The NOMA system may be referred to as Multiuser Superposition Transmission (MUST) in the 3GPP standardization task. The NOMA system is considered as the element technology of the next generation 5G system intended to obtain transmission capacity gain or increase the number of simultaneous accesses as compared with the LTE system by transmitting information for a plurality of UEs to the same time-frequency resource through superposition. Examples of the NOMA based technology of the next generation 5G system include MUST for identifying UEs based on a power level, Sparse Code Multiple Access (SCMA) that uses sparse complex codebook based modulation, and interleave division multiple access (IDMA) that uses a user-specific interleaver.

In case of the MUST system, the transmitter of FIG. 4 varies power allocation of each symbol after modulation of multi-UE data or transmits the multi-UE data by hierarchically modulating the multi-UE data based on hierarchical modulation, and the receiver demodulates the data of the multi-UE (hereinafter, referred to as multi-UE data) through multi-UE detection (or multiuser detection) (MUD).

In case of the SCMA system, the transmitter of FIG. 4 replaces a modulation procedure of a forward error correction (FEC) encoder and modulation procedure for multi-UE data with a sparse complex codebook modulation scheme which is previously scheduled, and the receiver demodulates the multi-UE data through MUD.

In case of the IDMA system, the transmitter of FIG. 4 modulates FEC encoding information for multi-UE data through a UE-specific interleaver, and the receiver demodulates the multi-UE data through MUD.

Each system may demodulate the multi-UE data in various MUD schemes. Examples of the various MUD schemes include Maximum Likelihood (ML), Maximum joint A posteriori Probability (MAP), Message Passing Algorithm (MPA), Matched Filtering (MF), Successive Interference Cancellation (SIC), Parallel Interference Cancellation (PIC), and Codeword Interference Cancellation (CWIC). There may be a difference in demodulation complexity and processing time delay in accordance with each demodulation scheme or each demodulation attempt.

Figure 5:
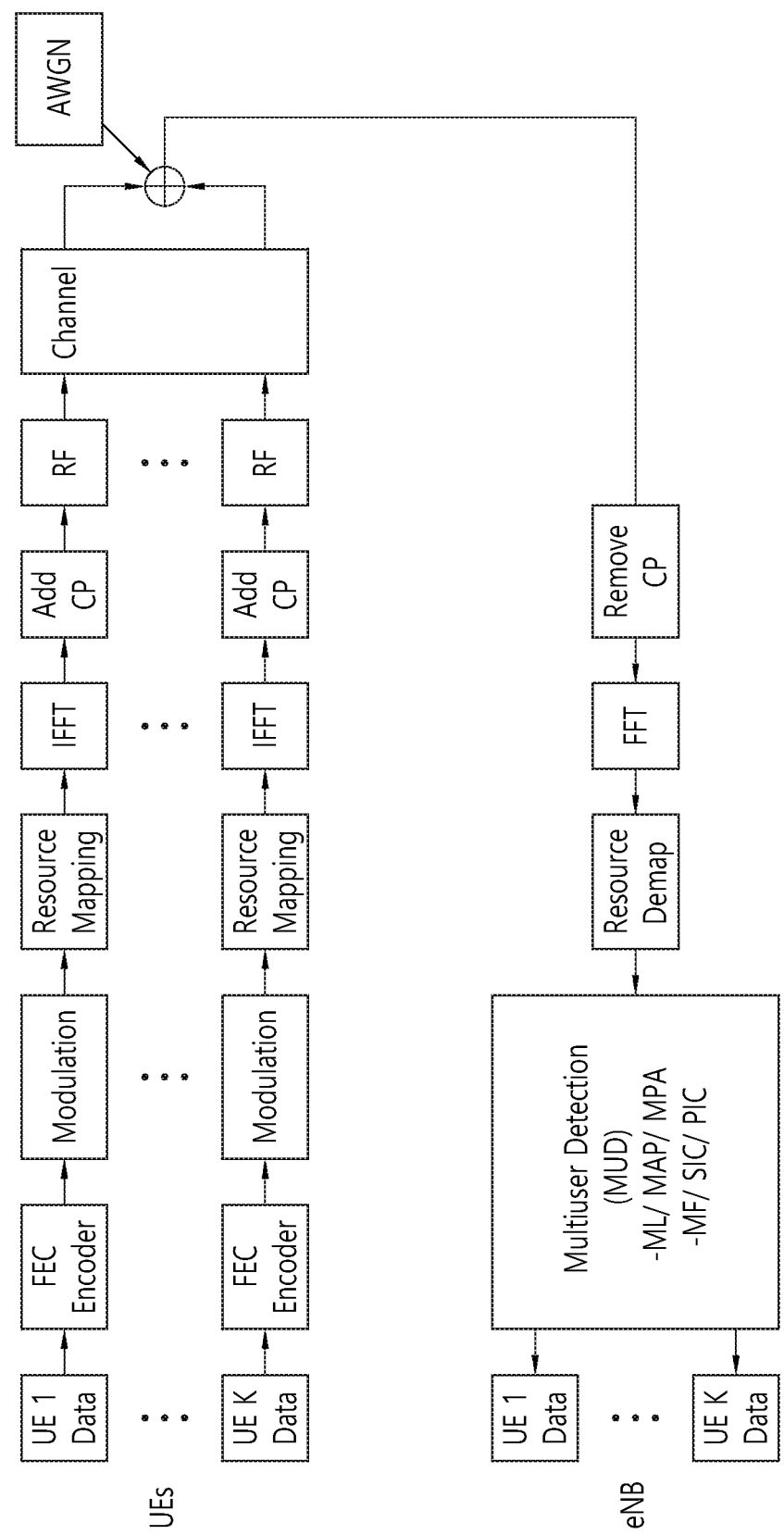
FIG. 5 is a block diagram illustrating NOMA based uplink transmission/reception (Tx/Rx) of a communication apparatus.

FIG. 5 is a block diagram illustrating NOMA based uplink transmission/reception (Tx/Rx) of a communication apparatus.

A transmitter and receiver structure for uplink support of the NOMA based system that transmits information of multi-UE (hereinafter, referred to as multi-UE information) by allocating the multi-UE information to the same resource is shown in FIG. 5. Each system may transmit multi-UE data in the same manner as the description of the downlink structure of FIG. 4 and modulate the multi-UE data through the receiver. Since the NOMA based systems transmit multi-UE signals to the same time-frequency resource through superposition, the systems have a higher decoding error rate as compared with the LTE system but may support higher frequency usage efficiency or more massive connectivity. The NOMA systems may achieve higher frequency usage efficiency or more massive connectivity while maintaining a decoding error through coding rate control in accordance with a system environment.

Since the NOMA based systems allocate data of multi-UEs to the same resource, interference of multi-UE data is necessarily generated as compared with allocation of single-UE data. A signal of the kth receiver in the NOMA based system of FIG. 4 is simply expressed as illustrated in the following Equation 1.

$$y_k = \sum_{n=1}^{K} h_k s_n + n_k = h_k s_k + \sum_{n \neq k, n=1}^{K} h_k s_n + n_k \quad \text{[Equation 1]}$$

In this case, $h_k$ means a channel from the transmitter to the kth receiver, $s_k$ means a data symbol to the kth receiver, and $n_k$ means signal noise. K is the number of multiple UEs allocated to the same time-frequency resource.

The second term $$\sum_{n \neq k, n=1}^{K} h_k s_n$$

of the third formula of the Equation 1 indicates multiuser interference (MUI) signal according to a data symbol to another receiver. Therefore, transmission capacity according to the received signal is simply expressed as illustrated in the following Equation 2.

$$C = \sum_{k=1}^{K} R_k \quad \text{[Equation 2]}$$

$$R_k = \log_2\left(1 + \frac{|h_k s_k|^2}{\left|\sum_{n \neq k, n=1}^{K} h_k s_n\right|^2 + \sigma_k}\right) = \log_2\left(1 + \frac{\text{Channel Gain}}{MUI + \text{Noise}}\right), \forall k$$

In transmission capacity of the above Equation 2, the number of Rk added in accordance with increase of K may be increased, whereby increase of C may be expected. However, each Rk may be reduced due to increase of MUI in accordance with increase of K, entire transmission capacity C may be reduced. In accordance with the MUD scheme, even though data of each UE may be demodulated while MUI is being effectively reduced, the presence of MUI reduces entire transmission capacity and requires MUD of high complexity. If MUI occurrence of data transmission of the multi-UE is minimized, higher transmission capacity may be expected. Alternatively, if MUI occurrence for data transmission of the multi-UE may be controlled quantitatively, higher transmission capacity may be planned by scheduling of data superposition of the multi-UE. Therefore, the development of multi-UE access technology that may control MUI according to data superposition transmission of the multi-UE is required. The development of multi-UE access technology that may control MUI generated during data superposition transmission of the multi-UE to the same time-frequency resource is required.

Therefore, the present invention suggests a non-orthogonal coded multiple access (NCMA) that minimizes multi-UE interference of the next generation 5G system.

Figure 6:
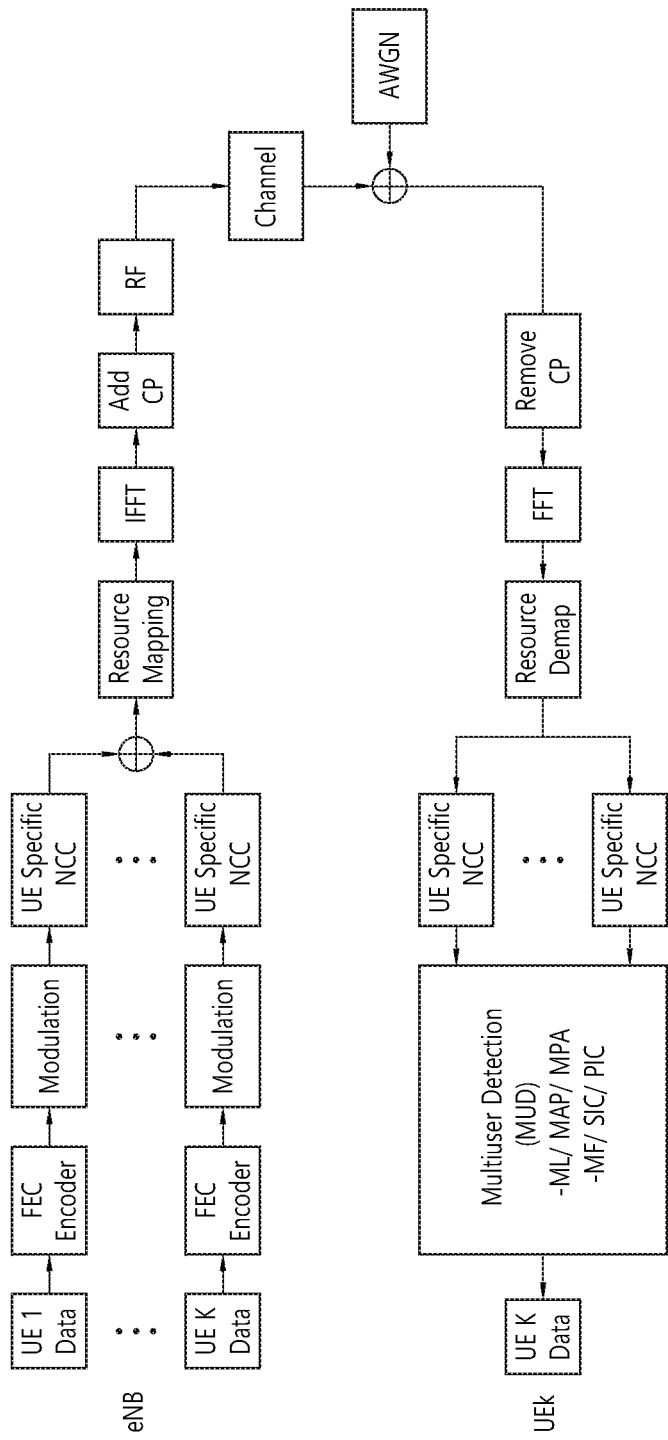
FIG. 6 is a block diagram illustrating NCMA based downlink transmission/reception (Tx/Rx) of a communication apparatus.
Figure 7:
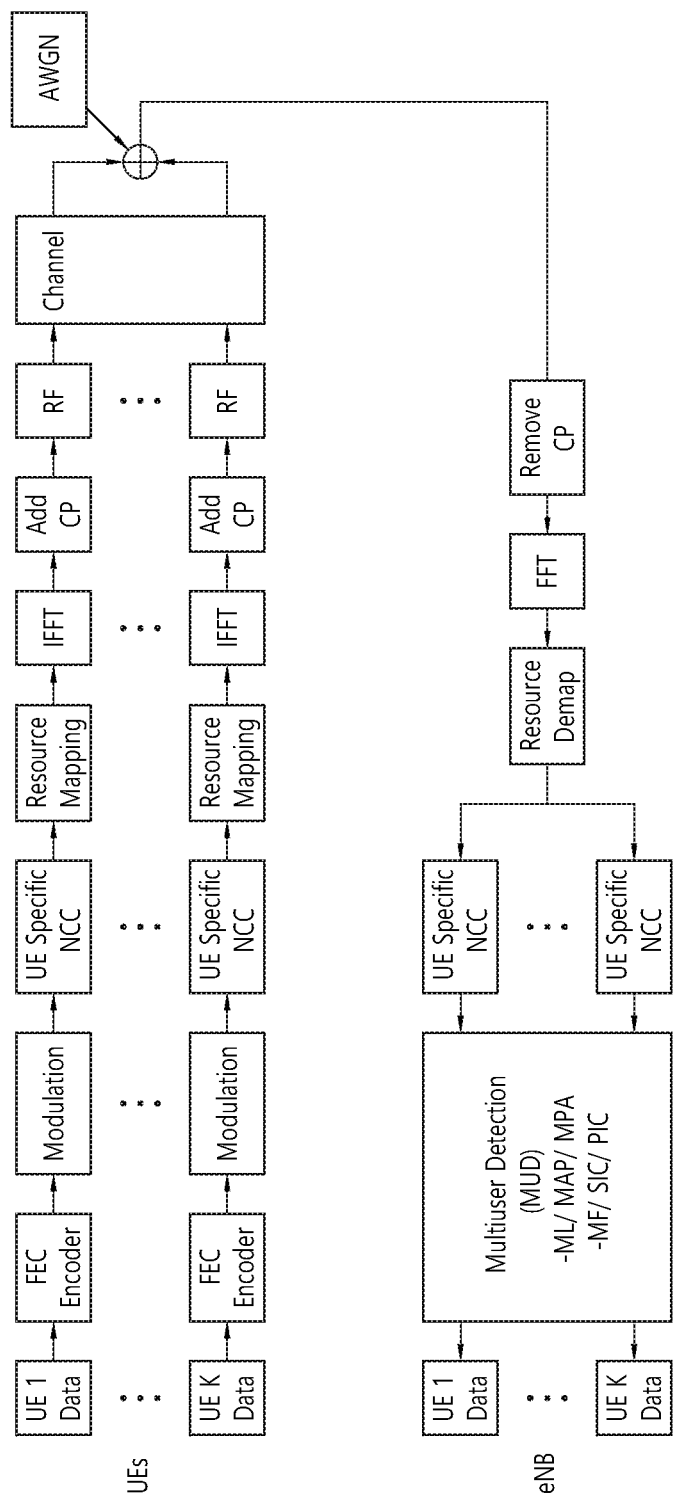
FIG. 7 is a block diagram illustrating NCMA based uplink transmission/reception (Tx/Rx) of a communication apparatus.

FIG. 6 is a block diagram illustrating NCMA based downlink transmission/reception (Tx/Rx) of a communication apparatus, and FIG. 7 is a block diagram illustrating NCMA based uplink transmission/reception (Tx/Rx) of a communication apparatus.

The present invention suggests an NCMA scheme that minimizes multi-UE interference when data of multi-UE are transmitted to the same time-frequency resource through superposition. FIGS. 6 and 7 illustrate downlink and uplink transmitter and receiver structures of the NCMA system that performs superposition transmission by using UE specific non-orthogonal code cover (NCC) when multi-UE information is allocated to the same time-frequency resource. The transmitter/receiver (or transmitting side/receiving side) allocates UE-specific NCC to each UE by using a non-orthogonal codebook which is previously defined.

The codeword mentioned in the present invention means a complex element vector selected by (or allocated to) each UE to perform non-orthogonal multiple access. The codebook means a set of codewords used by each UE to perform non-orthogonal multiple access. The codebook mentioned as above may exist as a plurality of codebooks. The UE-specific NCC means that the complex element vector of the codebook selected by (or allocated to) each UE is used for a symbol to be transmitted. Therefore, the NCC (or UE-specific NCC) may be expressed as codebook index and codeword index. The non-orthogonal codebook is expressed as illustrated in the following Equation 3.

$$C = [c^{(1)} \ \ldots \ c^{(K)}] = \begin{bmatrix} c_1^{(1)} & \ldots & c_1^{(K)} \\ \vdots & \ddots & \vdots \\ c_N^{(1)} & \ldots & c_N^{(K)} \end{bmatrix}$$ [Equation 3]

In the above Equation 3, $c^{(j)}$ is a codeword for the jth UE, and a codeword set for a total of K UEs becomes a codebook C. Use of $c^{(j)}$ for data transmission of the jth UE is defined as NCC. Also, the codebook may be expressed as a vector length N of the codeword and the number K of codewords. In this case, N means a spreading factor, and K means a superposition factor. For convenience of description, although one codeword is used for one UE, a plurality of codewords may be used by one UE or one codeword may be used by a plurality of UEs. Also, one or more codewords allocated to one UE may be subjected to hopping of codewords by use of different codewords in the same codebook or use of different codewords in different codebooks in accordance with time or usage frequency.

UE-specific NCC may be allocated by connection with UE ID in RRC connection process, or may be allocated through DCI (downlink control information) format included in a downlink control channel (for example, PDCCH).

In case of an uplink environment used for contention based multiple access (MA), a UE may select non-orthogonal codewords randomly or through connection with UE ID. At this time, UE-specific NCC is not allocated by a base station but directly selected by a UE, whereby NCC contention between multiple UEs may occur. A success rate for identification of multi-UE information is reduced due to MUD if there is contention of NCC in the base station which is a receiver.

The UE-specific NCC may be defined by Grassmannian line packing, and a chordal distance formed by two random vectors in the same subspace is always maintained equally. That is, the chordal distance may be obtained mathematically or algorithmically as a codebook that satisfies $$\min_C (\max_{1 \leq k < j \leq k} 1 - |c^{(k)*} \cdot c^{(j)}|^2, C \subset \mathbb{C}^{N \times K}.$$

The UE-specific NCC has features as expressed by the following Equation 4.

$$\begin{cases} |c^{(k)*} \cdot c^{(k)}| = 1, \ \forall \, k, k = 1, \ldots, K, \\ \text{if } N > K, |c^{(k)*} \cdot c^{(j)}| = \delta, \ \forall \, k, \forall \, j, k = 1, \ldots, K, j = 1, \ldots, K, \\ \text{if } N \leq K, |c^{(k)*} \cdot c^{(j)}| = 0, \ \forall \, k, \forall \, j, k = 1, \ldots, K, j = 1, \ldots, K. \end{cases}$$ [Equation 4]

In this case, $c^{(k)*}$ is a conjugate codeword of c(k). The features of the Equation 4 are as listed in the followings (1), (2), and (3).

(1) Multiplication of the same codewords in the transmitter and the receiver is 1.

(2) The chordal distance between a codeword and another codeword in the same codebook is equally maintained.

(3) If N≤K, a codeword is orthogonal to another codeword.

The codebook having the above features is previously scheduled by the transmitter/receiver (or transmitting side/receiving side) to configure UE-specific NCC. In this case, a lower bound of a chordal distance $$\delta_{N,K} \geq \sqrt{1 - \frac{(N-1)K}{N(K-1)}}$$

according to two random codewords is obtained. Therefore, MUI for superposition transmission of multi-UE data is determined by being minimized by the lower bound. Also, since the chordal distance for the two random codewords is always maintained equally, statistical prediction of MUI may be performed by the number of UEs. If the number of UEs is determined, since a decoding error rate of the receiver may be predicted by MUI value, MCS level may be controlled based on interference for multi-UE superimposition transmission. For example, when K codewords are transmitted in (N×1) dimension, if the receiver performs decoding using its codewords, 1 is decoded from its codeword, and statistical interference of $\delta_{N,K}(K-1)$ remains from another K−1 codewords. This value is varied depending on an optimization level of a codebook design. Also, since a difference in a value of $\delta_{N,K}$ exists depending on the optimization level of the codebook design, the number K of superposition UEs or the number N of used resources may be varied depending on Required SINR or target QoS of the communication system, whereby the MUI value may be controlled.

The embodiment of the non-orthogonal codebook is expressed in the form of 3GPP TS 36.211 as listed in that following Tables 1 and 2, and may be used as UE-specific NCC.

Table 1 illustrates a codebook in case of Spreading Factor N=2.

the transmitter and the receiver, data for the kth UE is multiplied by a codeword corresponding to the kth UE. At this time, one data symbol sk corresponds to a codeword vector $c^{(k)}$ of (N×1) dimension. Then, N elements of the codeword correspond to N subcarriers.

Figure 8:
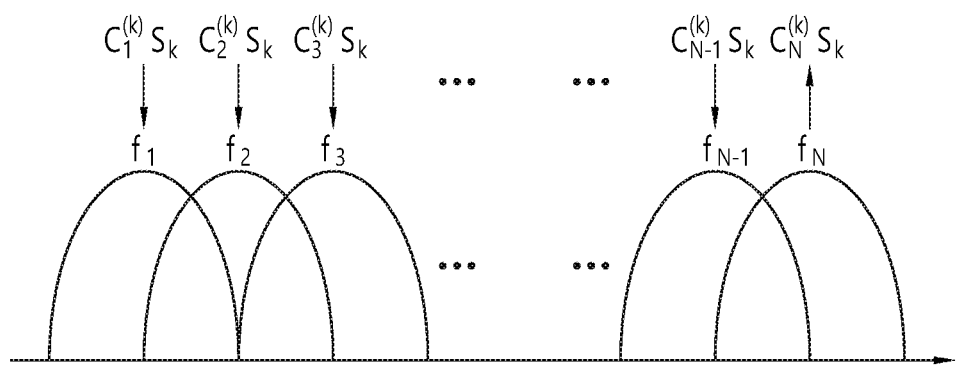
FIG. 8 is a conceptual diagram illustrating a frequency axis of data transmission according to UE-specific NCC.

That is, in FIG. 8, since one data symbol is transmitted to N subcarriers, the same time-frequency resource efficiency is reduced to 1/N as compared with the legacy LTE system. On the other hand, if N or more symbols are transmitted by

TABLE 1

| # of codewords (Max. # of users: K) | Examples of spreading codebook [$c^{(1)}$ ... $c^{(K)}$] |
|---|---|
| 2 | $\begin{bmatrix} 1 & 1 \\ 1 & -1 \end{bmatrix}$ |
| 3 | $\begin{bmatrix} -0.5078 - 0.2451i & -0.8055 + 0.5684i & -0.1483 - 0.4194i \\ 0.5640 - 0.6034i & 0.1640 + 0.0357i & -0.8751 - 0.1904i \end{bmatrix}$ |
| 4 | $\begin{bmatrix} -0.4907 - 0.7256i & -0.6440 - 0.5906i & -0.1657 + 0.2160i & -0.5775 - 0.2480i \\ 0.4510 + 0.1709i & -0.4452 + 0.1956i & 0.9349 - 0.2279i & -0.3586 - 0.6902i \end{bmatrix}$ |

Table 2 illustrates a codebook in case of Spreading Factor N=4.

superposition, time-frequency resource efficiency is increased as compared with the LTE system. For example,

TABLE 2

| # of codewords (Max. # of users: K) | Examples of spreading codebook [$c^{(1)}$ ... $c^{(K)}$] |
|---|---|
| 4 | $\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 6 | $\begin{bmatrix} -0.0557 - 0.4476i & -0.1684 - 0.8131i & -0.0149 + 0.2205i & \cdots \\ & -0.0198 - 0.1206i & -0.3294 - 0.3689i & -0.0487 - 0.4148i \\ 0.4023 - 0.1460i & -0.4021 + 0.2118i & -0.6703 + 0.0282i & \cdots \\ & -0.6521 - 0.4251i & -0.0729 - 0.0903i & -0.2158 - 0.3003i \\ -0.1499 - 0.3961i & 0.0471 - 0.2647i & 0.3131 - 0.5204i & \cdots \\ & -0.5576 - 0.0206i & 0.6726 - 0.0552i & 0.0357 + 0.0924i \\ 0.5675 + 0.3346i & -0.0866 + 0.1557i & -0.0287 + 0.3624i & \cdots \\ & -0.2086 + 0.2589i & 0.4567 - 0.2792i & 0.6985 + 0.4372i \end{bmatrix}$ |
| 8 | $\begin{bmatrix} -0.2381 - 0.8369i & -0.6599 - 0.1222i & -0.6557 - 0.1776i & -0.1561 + 0.0861i & \cdots \\ & -0.1374 + 0.1275i & -0.1849 + 0.3859i & -0.2426 - 0.2248i & -0.1703 - 0.0604i \\ -0.2593 - 0.3320i & 0.4906 + 0.0221i & 0.3934 + 0.2749i & -0.3453 - 0.2068i & \cdots \\ & -0.5596 + 0.0272i & 0.0616 + 0.0315i & -0.3027 - 0.3133i & -0.7664 + 0.1256i \\ -0.1249 + 0.0320i & 0.0425 + 0.3856i & 0.0440 - 0.3295i & -0.3979 - 0.0525i & \cdots \\ & -0.5272 - 0.2195i & 0.0649 - 0.8770i & -0.2452 + 0.4427i & -0.0149 - 0.4727i \\ -0.2180 - 0.0342i & 0.3968 - 0.0250i & -0.3444 - 0.2811i & -0.7817 - 0.1845i & \cdots \\ & 0.2417 + 0.5162i & 0.1956 - 0.0203i & 0.4625 - 0.4805i & 0.0794 - 0.3663i \end{bmatrix}$ |

Various values may be obtained using mathematical equation or algorithm in addition to the above Tables 1 and 2.

FIG. 8 is a conceptual diagram illustrating a frequency axis of data transmission according to UE-specific NCC.

FIG. 8 illustrates a concept that a transmitter (or transmitting side) transmits kth UE data on a frequency axis through UE-specific NCC. When UE-specific NCC defined by Grassmaniann line packing is previously scheduled by if K symbols are transmitted by superposition in case of N<K, frequency resource efficiency is increased as much as K/N times.

Figure 9:
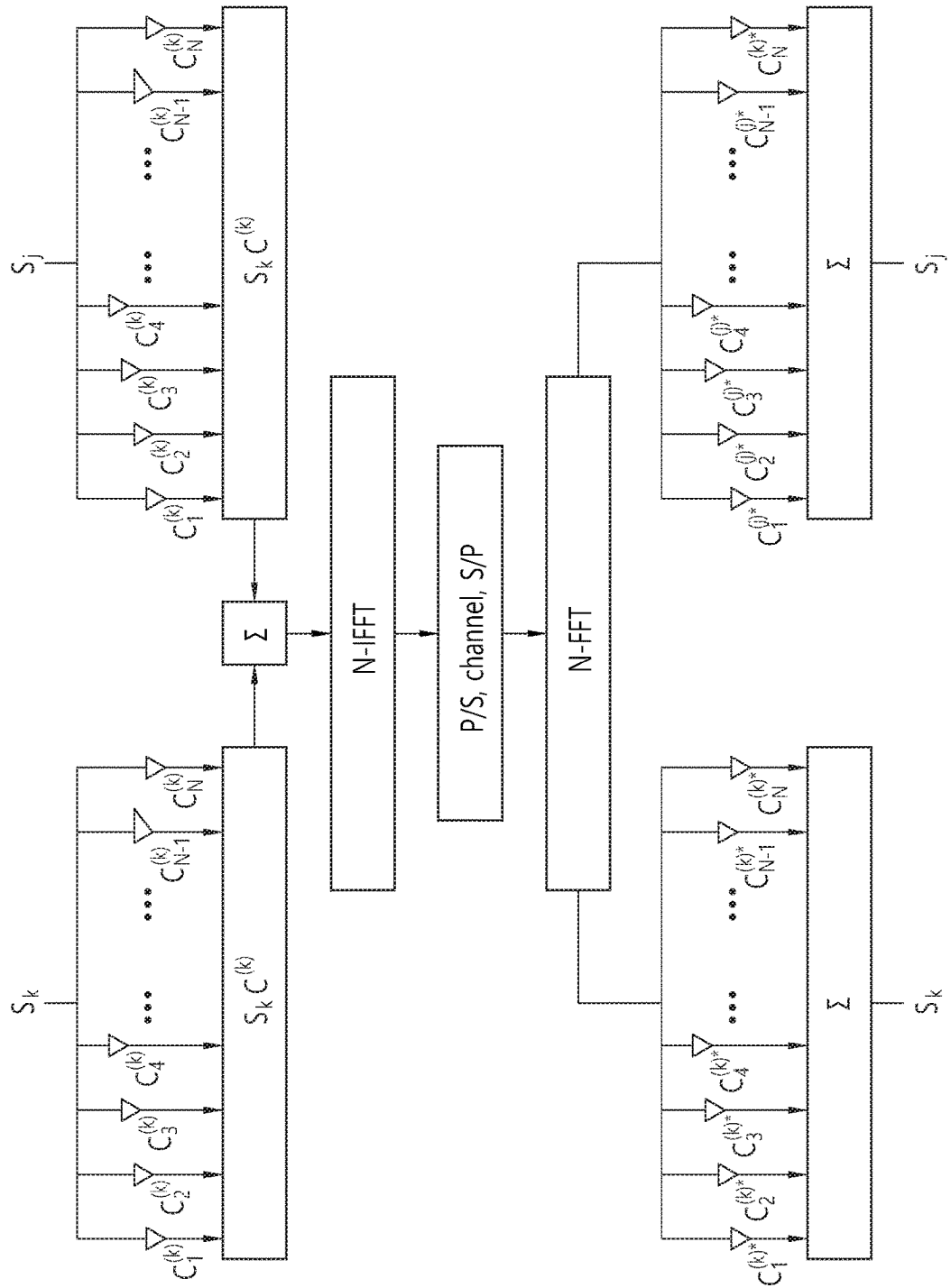
FIG. 9 is a structural diagram illustrating basic transmission and reception of NCMA system.

FIG. 9 is a structural diagram illustrating basic transmission and reception of NCMA system.

FIG. 9 is a basic transmission and reception structural view of NCMA system that uses UE-specific NCC. Data symbols for each UE are converted to UE-specific NCC corresponding to each UE and superposed in the transmitter. A frequency axis signal of a superposed N length is converted to a time-axis signal through N-IFFT, whereby OFDM transmission is performed, and the receiver restores the time-axis signal to a frequency-axis signal through N-FFT. The restored frequency-axis signal decodes each UE data symbol using a conjugate codeword of UE-specific NCC corresponding to each UE. The decoded $s_k$ may include MUI depending on the number of superposed UEs, and exact $s_k$ decoding is available through MUD. At this time, the length of the frequency-axis signal converted in accordance with UE-specific NCC which is previously defined may be shorter than N. For example, if two frequency-axis signal vectors converted to UE-specific NCC of N/2 length are connected in series to form N length, it will be apparent that demodulation is available in the receiver even in case of N-FFT.

In case of downlink, a detection equation for data decoding in the kth UE receiver is expressed as illustrated in the following Equation 5.

$$y_k = \sum_{n=1}^{K} H_k c^{(n)} s_n + n_k, \quad \text{[Equation 5]}$$

$$\hat{y}_k = \left[\frac{[y_k]_j}{[H_k]_{j,j}}\right]_{j=1,\ldots,N} = \sum_{n=1}^{K} c^{(n)} s_n + \hat{n}_k,$$

In the above Equation 5, $H_k$ means (N×N) channel matrix from the kth transmitter to the receiver, and includes frequency-axis channel coefficients as a diagonal matrix. $c^{(k)}$ is (N×1) UE-specific NCC vector for the receiver at the kth transmitter, $s_k$ is a data symbol to the kth receiver, and n means (N×1) signal noise vector. K is the number of multi-UEs allocated to the same time-frequency resource. In this case, $$\left[\frac{[A]_j}{[B]_{j,j}}\right]_{j=1,\ldots,N}$$

means division of the jth element of vector A and the jth diagonal element of matrix B. If the vector A is a diagonal matrix, the vector A means element division of diagonal matrixes.

A signal of desired codewords and noise remain through channel compensation in the above Equation 5, and are detected as expressed by the following Equation 6 through conjugate codeword of UE-specific NCC of the receiver.

$$\tilde{y}_k = c^{(k)*} \cdot \hat{y}_k = c^{(k)*} \cdot c^{(k)} s_k + \sum_{n \neq k, n=1}^{K} c^{(k)*} \cdot c^{(n)} s_n + \tilde{n}_k, \quad \text{[Equation 6]}$$

$$= s_k + \sum_{n \neq k, n=1}^{K} c^{(k)*} \cdot c^{(n)} \cdot s_n + \tilde{n}_k.$$

In the above Equation 6, the second item of the last column indicates MUI, and may be removed or reduced through the MUD scheme.

In case of uplink, a detection equation for data decoding in the receiver of the base station is expressed as illustrated in the following Equation 7.

$$y = \sum_{n=1}^{K} H_n c^{(n)} s_n + n = H_k c^{(k)} s_k + \sum_{n \neq k, n=1}^{K} H_n c^{(n)} s_n + n, \quad \text{[Equation 7]}$$

The second term of the third formula of the Equation 7 indicates multi-UE interference signal MUI according to a data symbol to another receiver. A detection equation of the receiver for data decoding of the kth UE is expressed as illustrated in the following Equation 8.

$$\hat{y}_k = \left[\frac{[y]_j}{[H_k]_{j,j}}\right]_{j=1,\ldots,N} = \quad \text{[Equation 8]}$$

$$c^{(k)} s_k + \sum_{n=1}^{K} \left[\frac{[H_n]_{j,j}}{[H_k]_{j,j}}\right]_{j=1,\ldots,N} c^{(n)} s_n + \hat{n},$$

A signal of desired codewords, MUI, and noise remain through channel compensation for the kth UE data, and are detected as expressed by the following Equation 9 through conjugate codeword of UE-specific NCC of the receiver.

$$\tilde{y}_k = c^{(k)*} \cdot \hat{y}_k = c^{(k)*} \cdot c^{(k)} s_k + \sum_{n \neq k, n=1}^{K} c^{(k)*} \cdot \left[\frac{[H_n]_{j,j}}{[H_k]_{j,j}}\right]_{j=1,\ldots,N} c^{(n)} s_n + \tilde{n}, \quad \text{[Equation 9]}$$

$$= s_k + \sum_{n \neq k, n=1}^{K} c^{(k)*} \cdot \left[\frac{[H_n]_{j,j}}{[H_k]_{j,j}}\right]_{j=1,\ldots,N} c^{(n)} \cdot s_n + \tilde{n}.$$

In the above Equation 9, the second item of the last column indicates MUI, and may be removed or reduced through the MUD scheme. At this time, frequency-axis channel change of $$\left[\frac{[H_n]_{j,j}}{[H_k]_{j,j}}\right]_{j=1,\ldots,N}$$

causes a change of MUI value when MUD according to UE-specific NCC is performed due to a change of a channel environment from the multi-UE. For convenience of description, a single transmitting and receiving antennas is provided, it will be apparent that the same scheme is applied to even an environment where multiple antennas are used.

According to the description related to the aforementioned NCMA scheme, it is possible to achieve higher frequency usage efficiency or more massive connectivity in accordance with the number of superposed UEs while controlling MUI according to multi-UE data superposition transmission.

The present specification proposes a scheme for a partial overlapping reference signal of non-orthogonal multiple access (NOMA) for supporting massive connectivity.

Figure 10:
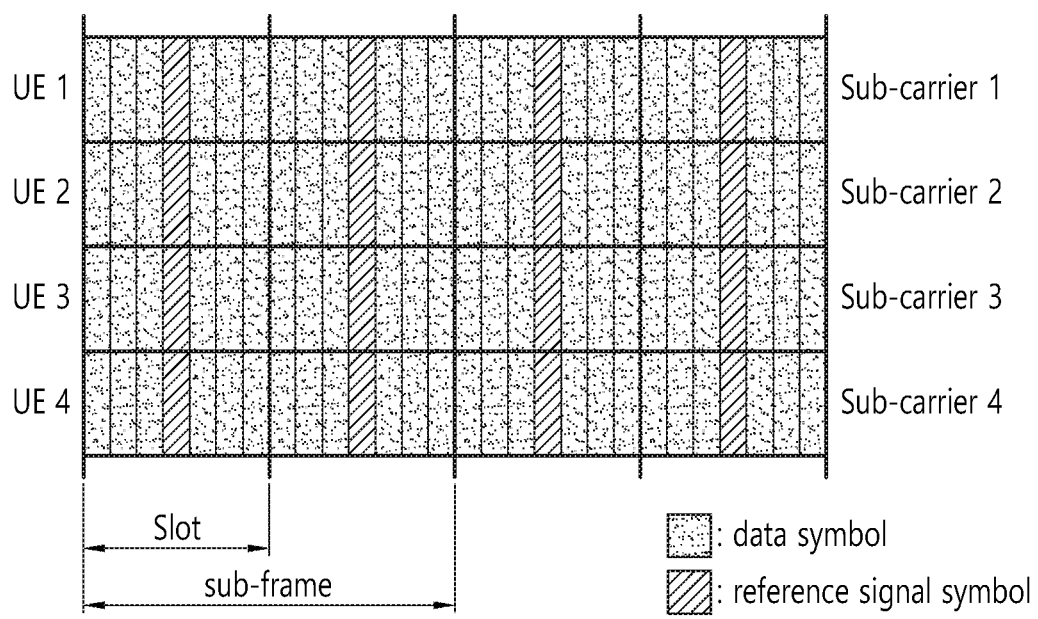
FIG. 10 illustrates a frame structure for supporting an uplink in a long term evolution (LTE)/LTE-advanced (LTE-A) system.

FIG. 10 illustrates a frame structure for supporting an uplink in a long term evolution (LTE)/LTE-advanced (LTE-A) system.

In FIG. 10, a data symbol may consist of a physical uplink shared channel (PUSCH) or a physical uplink control channel (PUCCH) or the like, and a reference symbol may consist of a DMRS or the like. The frame structure of FIG. 10 may be various according to an environment of a wireless communication system. That is, a subframe structure, a slot length, and the number of symbols in a slot may vary. In addition, the frame structure may be used in an ad-hoc network such as a device to device (D2D) UE, which performs direct communication between UEs, or vehicular to everything (V2X) or the like and a cellular-based scheme such as LTE-A, machine type communication (MTC), or the like. In case of the legacy wireless communication system, a time-frequency resource may be allocated to a UE, and a data symbol and a reference symbol may be used differently by using an orthogonal resource. Therefore, a signal of each UE can be demodulated without interference from another UE.

Figure 11:
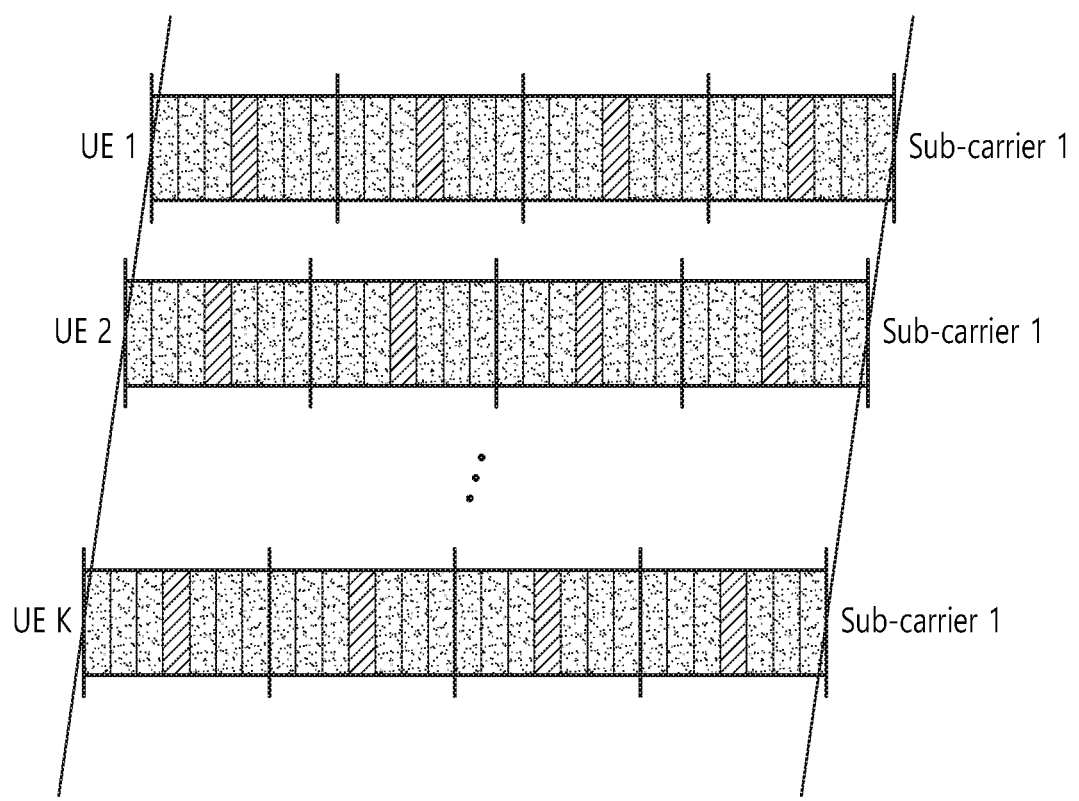
FIG. 11 illustrates a frame structure for a multi-user data overlapping transmission scheme based on non-orthogonal multiple access.

FIG. 11 illustrates a frame structure for a multi-user data overlapping transmission scheme based on non-orthogonal multiple access.

The frame structure of FIG. 11 is the same as the frame structure of FIG. 10, but multiple UEs (or users) share the same frequency resource so that a non-orthogonal time-frequency resource is allocated to the UE (or user). For example, as shown in FIG. 11, since a UE 1 to a UE K use the same frequency resource sub-carrier 1, a data symbol and a reference symbol overlap.

The reference symbol uses auto-correlation and cross-correlation properties of a sequence to estimate a channel coefficient. In case of having a low cross-correlation between multiple sequences, an overlapping reference symbol of multiple UEs can be identified in a receiver. For example, each UE may configure a reference symbol and transmit it in an overlapping manner on the basis of a Zadoff-Chu sequence or the like which is one of CAZAC sequences. According to a sequence configuration, the overlapping reference symbol of the multiple UEs may be completely demodulated, or may be demodulated while having only significantly low interference.

Figure 12:
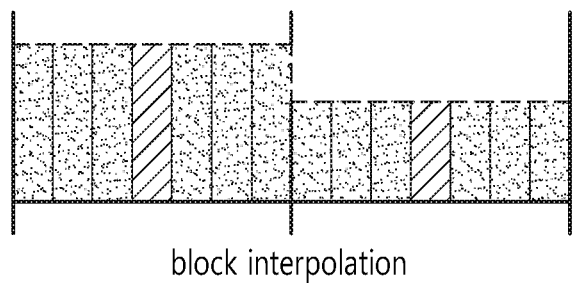
FIG. 12 is an exemplary diagram for explaining interpolation methods for channel estimation.
Figure 12:
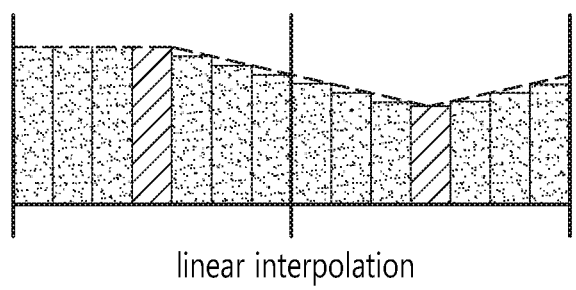
Figure 12:
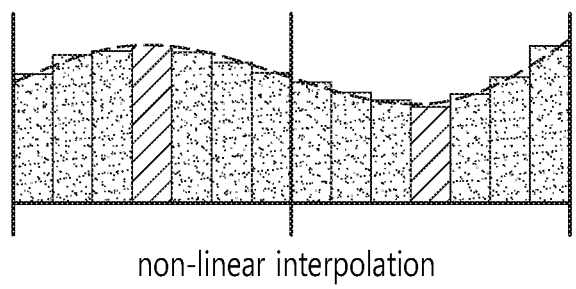

FIG. 12 is an exemplary diagram for explaining interpolation methods for channel estimation.

A demodulated reference symbol may perform channel estimation by using an interpolation scheme or the like of FIG. 12. The interpolation scheme may be configured differently according to a system environment or a coherence time, and may be configured variously according to a frame structure based on a normal cyclic prefix (CP) and extended CP structure.

A data symbol may perform multiuser detection (MUD) through a receiver supporting NOMA on the basis of channel estimation depending on a reference symbol. For example, it is possible to utilize Maximum Likelihood (ML) detection or Maximum joint A posteriori Probability (MAP), Codeword Interference Cancellation (CWIC) of Multiuser Superposition Transmission (MUST), Massage Passing Algorithm (MPA) of Sparse Code Multiple Access (SCMA), Parallel Interference Cancellation (PIC) of Interleave Division Multiple Access (IDMA), or the like. The MUD scheme of the data symbol may be defined variously according to a scheme of designing non-orthogonal multiple access transmission/reception.

Since signals of multiple UEs are transmitted in an overlapping manner by using the same time-frequency resource, the non-orthogonal multiple access scheme has a higher decoding error rate than an LTE system, but can support higher frequency usage efficiency or more massive connectivity. The non-orthogonal multiple access scheme can achieve higher frequency usage efficiency or more massive connectivity while maintaining the decoding error rate through coding rate control in accordance with a system environment.

As described above, the present invention proposes a UE grouping scheme and reference signal hopping scheme of a non-orthogonal multiple access system to support massive connectivity.

Reference Signal Hopping Method for Massive Connectivity

A multiple access scheme in which demodulation is possible while supporting at least the maximum number of reference symbols based on a sequence is required to support massive connectivity.

Figure 13:
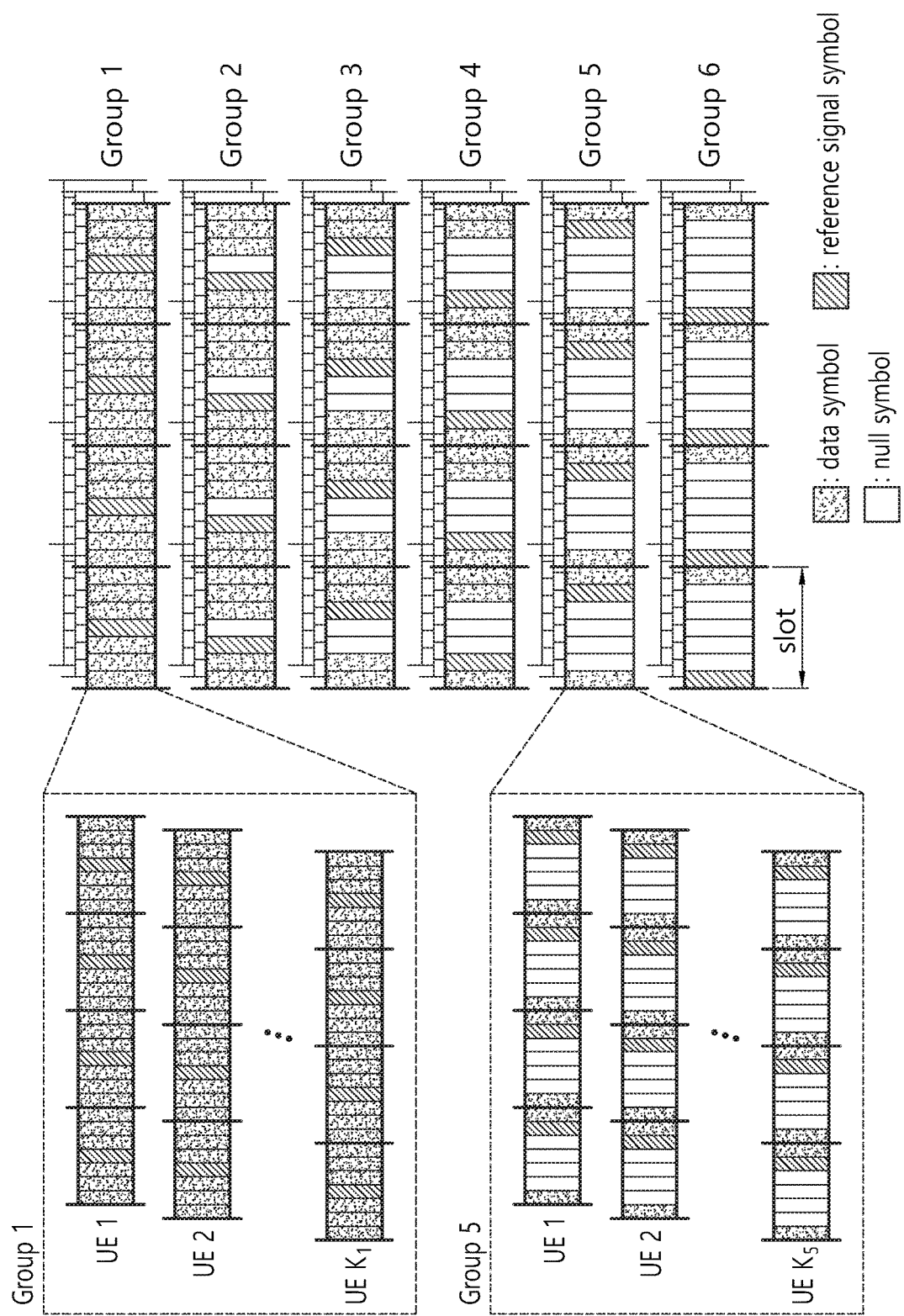
FIG. 13 illustrates an example of a frame structure of a NOMA group based on reference signal hopping.

FIG. 13 illustrates an example of a frame structure of a NOMA group based on reference signal hopping.

A multiple access scheme in which demodulation is possible while supporting at least the maximum number of reference symbols based on a sequence is proposed to support massive connectivity. FIG. 13 illustrates a frame structure of groups of non-orthogonal multiple access UEs which share one frequency resource (herein, a UE group is determined randomly, and a UE grouping scheme is described in detail in an embodiment 2).

In order to support at least the maximum number of reference symbols, the maximum number of reference symbols are all used in each group, and as shown in FIG. 3, a reference symbol of each group is configured by avoiding overlapping with a reference symbol of another group. If 3GPP LTE is taken for example for convenience of description, the maximum number of UE groups to be supported is up to 6 in the normal CP frame structure of FIG. 13, and is up to 5 in the extended CP frame structure. In this case, the greater the number of overlapping groups, the more difficult it is to demodulate the signal. Therefore, the number of groups to be used may differ depending on a system environment or a QoS constraint. In addition, the maximum number of UEs that can be supported in one group is equal to the maximum number of sequence-based reference signals. Since demodulation of a signal is difficult in proportion to the number of UEs which perform NOMA in one group, the number of UEs in the same group may vary depending on the system environment or the QoS constraint. Meanwhile, UEs in the same group may be allowed to apply different code and transmission power, so that an eNB can identify the UEs in the same group. In addition, when UEs are also allowed to apply different code or transmission power between different groups, the eNB may perform decoding in a state of minimizing interference between UEs for multiple groups. Since the maximum number of overlapping through the aforementioned NOMA scheme is greater than the maximum number of reference symbols, it is possible to support a NOMA service across multiple groups.

For example, in FIG. 13, a group 1 is a multi-UE group which performs the NOMA of FIG. 11 and consists of K1 users. MUD performance for the group 1 is decreased in proportion to an increase in the number $K_1$ of users of the group 1, and is increased in proportion to a decrease in the number $K_1$. In addition, if only the group 1 is served, the MUD performance is increased since there is no interference to another group. The MUD performance is decreased in proportion to an increase in the number of groups to be served.

When reference signal hopping is performed on the multiple groups of FIG. 13, the reference symbol of the group 1 can be demodulated with interference to another group, and a reference symbol of a group 2 is to be demodulated in a state of being interfered by a data symbol of the group 1. That is, a reference symbol of a higher group (low order) is not interfered from symbols of a lower group (high order), and a reference symbol of the lower group is interfered from symbols of the higher group. For detailed descriptions, a reception signal for symbols in one slot of FIG. 13 is expressed by Equation 10 below.

$$y(1) = \sum_{g=1}^{G-1} \sum_{k=1}^{K_g} h_k^{(g)} d_k^{(g)} + \sum_{k=1}^{K_6} h_k^{(6)} P_k + n_1,$$

$$y(2) = \sum_{g=1}^{G-3} \sum_{k=1}^{K_g} h_k^{(g)} d_k^{(g)} + \sum_{k=1}^{K_4} h_k^{(4)} P_k + n_2,$$

$$y(3) = \sum_{g=1}^{G-5} \sum_{k=1}^{K_g} h_k^{(g)} d_k^{(g)} + \sum_{k=1}^{K_2} h_k^{(2)} P_k + n_3,$$

$$y(4) = \sum_{k=1}^{K_1} h_k^{(1)} P_k + n_4,$$

$$y(5) = \sum_{g=1}^{G-4} \sum_{k=1}^{K_g} h_k^{(g)} d_k^{(g)} + \sum_{k=1}^{K_3} h_k^{(3)} P_k + n_5,$$

$$y(6) = \sum_{g=1}^{G-2} \sum_{k=1}^{K_g} h_k^{(g)} d_k^{(g)} + \sum_{k=1}^{K_5} h_k^{(5)} P_k + n_6,$$

$$y(7) = \sum_{g=1}^{G} \sum_{k=1}^{K_g} h_k^{(g)} d_k^{(g)} + n_7.$$

[Equation 10]

$y(m)$ denotes a reception signal of an $m^{th}$ symbol in one slot, and consists of a channel $h_k^{(g)}$ and data symbol $d_k^{(g)}$ from a $k^{th}$ UE of a $g^{th}$ group, a reference symbol $P_k$, and reception noise $n_m$. G denotes the total number of groups, and $K_g$ denotes the total number of UEs in the $g^{th}$ group. A reference symbol $P_k$ used in each group may use the same sequence since overlapping is not achieved using a reference signal avoiding (or hopping) scheme.

Then, a $4^{th}$ symbol $y(4)$ consists of reference symbols from $1^{st}$ group UEs. Since a reference symbol of each UE uses a sequence in which cross correlation is set to 0 or a minimum possible value, channel estimation may be performed by performing auto-correlation with its own sequence. In this case, a maximum value of $K_1$ is equal to a maximum value of $P_k$. A data symbol from $1^{st}$ group UEs of $y(3)$ may be determined based on estimated channel information, which is expressed by Equation 11 below. In this case, the MUD scheme may vary depending on the NOMA scheme in use.

$$\sum_{g=1}^{1} \sum_{k=1}^{K_1} d_k^{(1)} = \frac{y(3)}{\widetilde{h^{(1)}}} = \sum_{g=1}^{1} \sum_{k=1}^{K_1} d_k^{(1)} + \sum_{k=1}^{K_2} \frac{h_k^{(2)}}{\widetilde{h^{(1)}}} P_k + \frac{n_3}{\widetilde{h^{(1)}}}$$

[Equation 11]

In Equation 11 above, $\widetilde{h^{(1)}}$ is a channel compensation term for multiple UEs of the group 1. Equation 11 above may be changed according to a channel compensation scheme. In Equation 11, a second item on the right side represents interference caused by a reference symbol from second group users, and a third item represents a changed noise value.

The third symbol $y(3)$ consists of data symbols from the first group UEs and reference symbols from the second group UEs (see Equation 12 below). Therefore, if the data symbols from the first group UEs have been demodulated, channel estimation may be performed by cancelling interference on reference symbols of the second group.

$$\sum_{k=1}^{K_2} h_k^{(2)} P_k + n_3 = y(3) - \sum_{g=1}^{1} \sum_{k=1}^{K_1} \widetilde{h_k^{(1)}} d_k^{(1)}$$

[Equation 12]

Herein, since data symbols from the first group UEs have been demodulated in a state of being interfered by reference symbols of the second group, there may be an error for demodulation. Therefore, data symbols from the first group UEs may be iteratively detected by considering channel estimation through reference symbols of the second group. This may be expressed by Equation 13 below.

$$\sum_{g=1}^{1} \sum_{k=1}^{K_1} \widetilde{d_k^{(1)}} + \widetilde{n_3} = y(3) - \sum_{k=1}^{K_2} \widetilde{h_k^{(2)}} P_k$$

[Equation 13]

In this manner, reception signals from $y(1)$ to $y(7)$ can be iteratively demodulated. A procedure of an iterative demodulation scheme between groups may be expressed as shown in FIG. 14.

Figure 14:
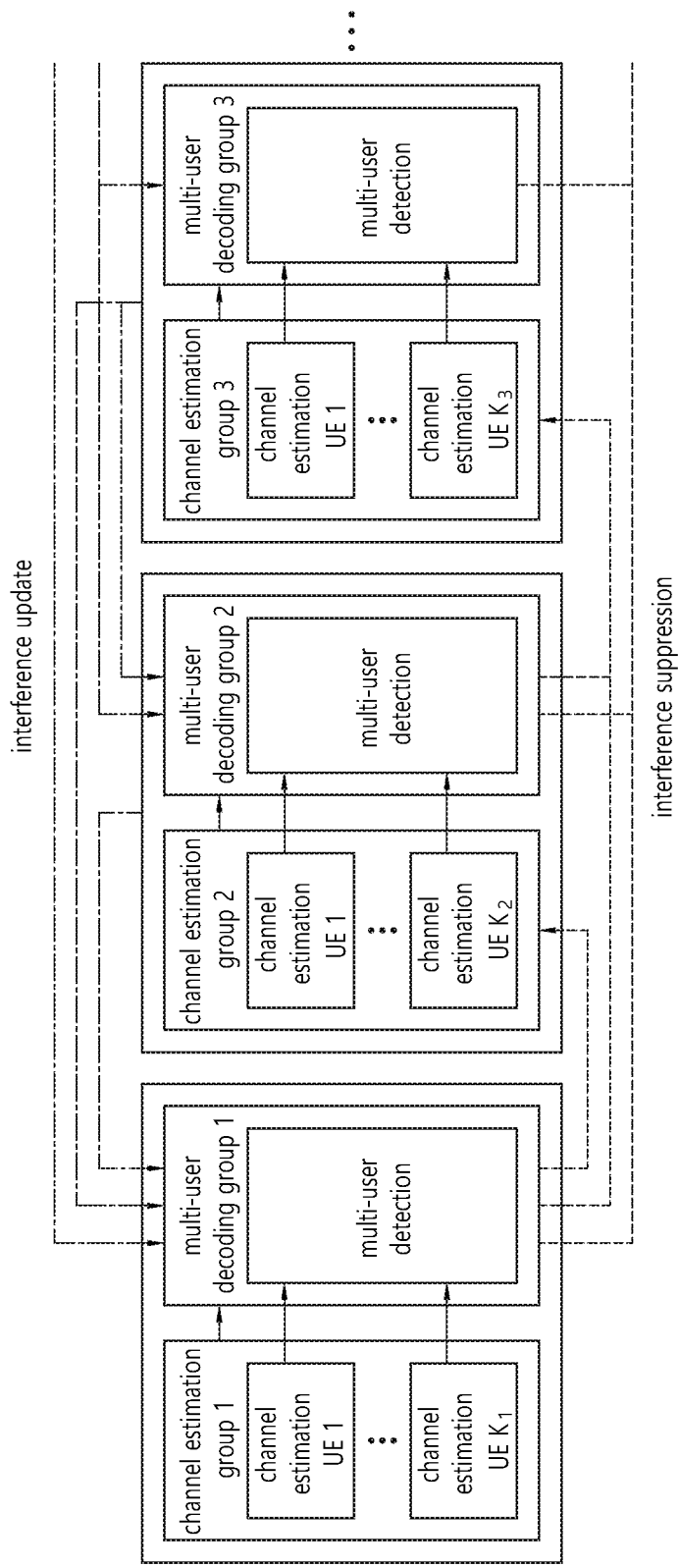
FIG. 14 illustrates a procedure for iterative multi-group detection.

FIG. 14 illustrates a procedure for iterative multi-group detection.

In FIG. 14, an MUD scheme of each group may be defined variously through a receiver which supports NOMA. For example, it is possible to utilize Maximum Likelihood (ML) detection or Maximum joint A posteriori Probability (MAP), Codeword Interference Cancellation (CWIC) of Multiuser Superposition Transmission (MUST), Massage Passing Algorithm (MPA) of Sparse Code Multiple Access (SCMA), Parallel Interference Cancellation (PIC) of Interleave Division Multiple Access (IDMA), or the like. The MUD scheme of the data symbol may be defined variously according to a scheme of designing non-orthogonal multiple access transmission/reception.

When the proposed scheme is used, the maximum number of sequences of reference signals may be multiplied by the number of groups to support massive connectivity. In the above scheme, a reference signal hopping pattern is exemplified as follows.

Embodiment 1: Reference Signal Hopping Pattern Based on Normal Cyclic Prefix (CP) Frame Structure FIG. 15 illustrates an example of a reference signal hopping pattern based on a normal CP frame structure.

Figure 15:
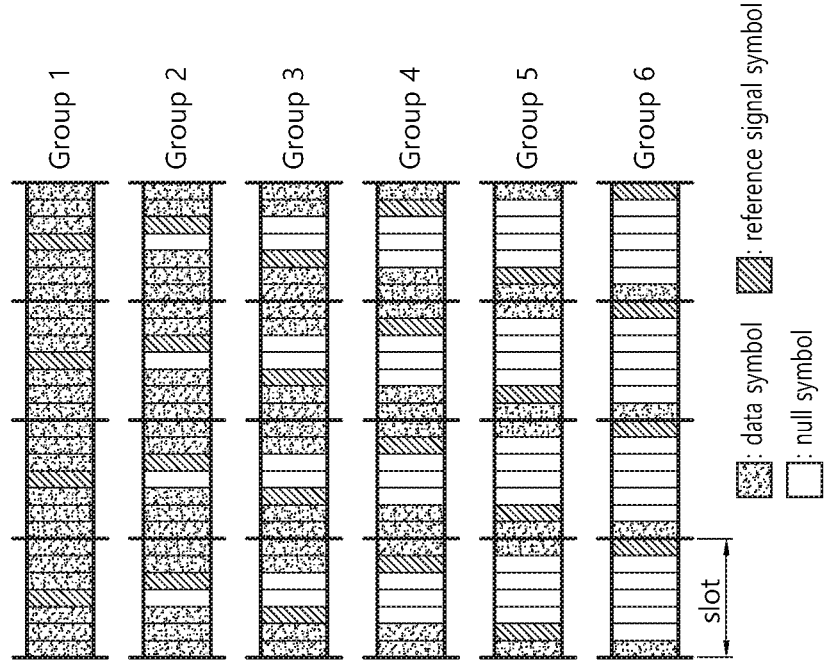
FIG. 15 illustrates an example of a reference signal hopping pattern based on a normal cyclic prefix (CP) frame structure.
Figure 15:
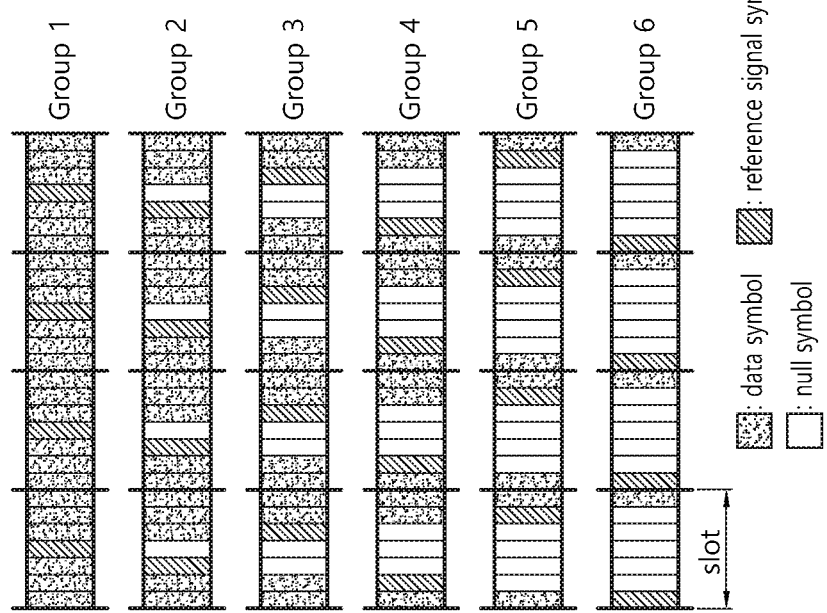

The reference signal hopping pattern is illustrated in FIG. 15 by exemplifying two subframes. Block, linear, and non-linear interpolation of FIG. 12 are possible in a group 1 of FIG. 15 according to a system environment. On the other hand, other groups may experience performance deterioration in block interpolation since a reference signal is not positioned at a center of a slot and is separated from a data symbol. Therefore, a UE can prevent performance deterioration in channel estimation by performing block interpolation on three symbols in the left and right to a reference symbol. In this case, channel estimation is performed beyond a slot boundary for channel estimation. For example, in a group 4 of a reference signal hopping pattern 0 of FIG. 15(a), block interpolation is performed on three symbols previous to a reference symbol (a $1^{st}$ symbol of the reference symbol and $6^{th}$ and $7^{th}$ symbols of a previous slot). Similarly, in a group 5, block interpolation is performed on two symbols next to the reference symbol (a $7^{th}$ symbol of the reference symbol and a $1^{st}$ symbol of a next slot).

In the same manner, it is also applicable to other groups and groups of the reference signal hopping pattern 1 of FIG. 15(b). Alternatively, channel estimation performance can be improved through linear interpolation and non-linear interpolation.

Embodiment 1 is an example of a reference signal hopping pattern, which corresponds to another pattern using the maximum number of reference symbols in each group, while preventing the reference symbols from overlapping by using another scheme.

Embodiment 2: Reference Signal Hopping Pattern Based on Extended CP Frame Structure FIG. 16 illustrates an example of a reference signal hopping pattern based on an extended CP frame structure.

Figure 16:
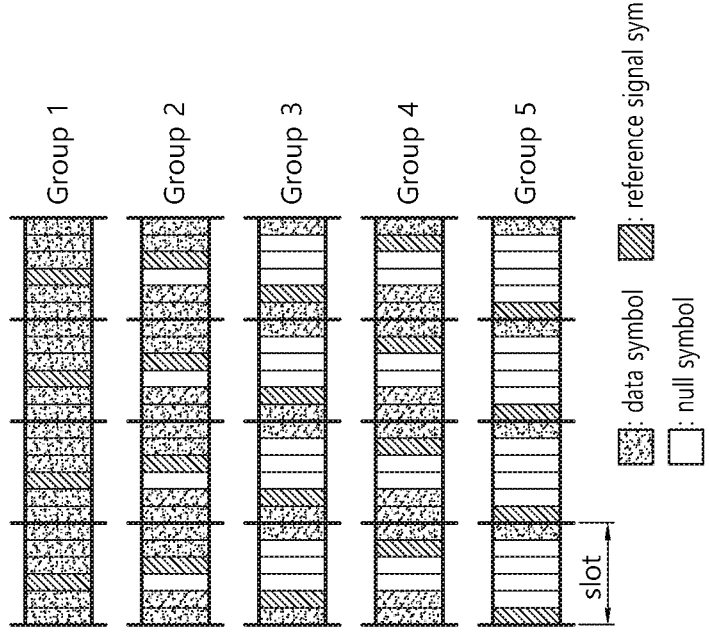
FIG. 16 illustrates an example of a reference signal hopping pattern based on an extended CP frame structure.
Figure 16:
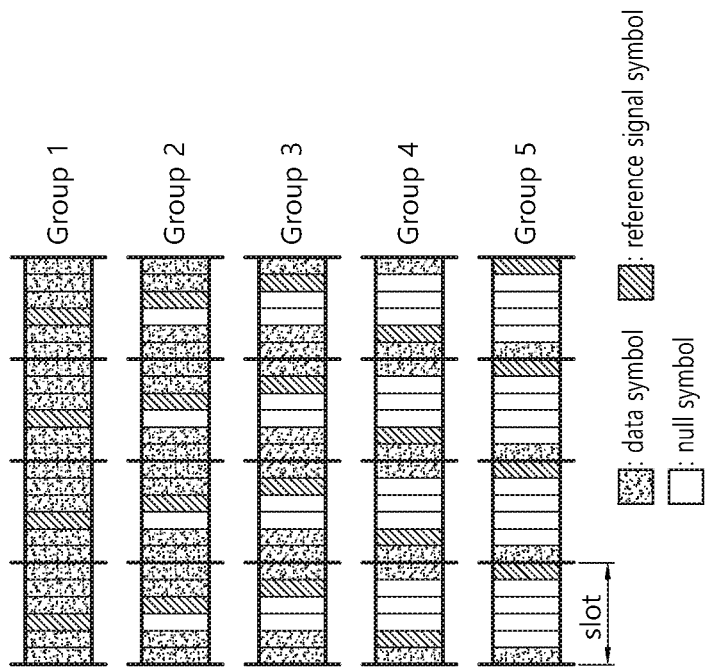

The reference signal hopping pattern is illustrated in FIG. 16 by exemplifying two subframes. Block, linear, and non-linear interpolation of FIG. 12 are possible in groups 1 and 2 of FIG. 16 according to a system environment. On the other hand, other groups may experience performance deterioration in block interpolation since a reference signal is not positioned at a center of a slot and is separated from a data symbol. Therefore, performance deterioration in channel estimation can be prevented by performing block interpolation on left two and right three symbols with respect to a reference symbol. In this case, channel estimation is performed beyond a slot boundary for channel estimation.

For example, in the group 3 of the reference signal hopping pattern 0 of FIG. 16(a), block interpolation is performed on last three symbols with respect to a reference symbol (a $6^{th}$ symbol of the reference slot and $1^{st}$ and $2^{nd}$ symbols of a next slot). Similarly, in a group 4, block interpolation is performed on first two symbols with reference to the reference symbol (a $1^{st}$ symbol of a reference slot and a $6^{th}$ symbol of a previous slot). In the same manner, it is also applicable to other groups and groups of the reference signal hopping pattern 1 of FIG. 16(b). Alternatively, channel estimation performance can be improved through linear interpolation and non-linear interpolation.

Embodiment 2 is an example of a reference signal hopping pattern, which corresponds to another pattern using the maximum number of reference symbols in each group, while preventing the reference symbols from overlapping by using another scheme.

Non-Orthogonal Multiple Access UE Grouping for Massive Connectivity

In order to perform the aforementioned reference signal hopping method for massive connectivity, a UE grouping scheme based on non-orthogonal multiple access needs to be defined and signaled.

The UE grouping scheme based on non-orthogonal multiple access is proposed to perform the reference signaling hopping scheme proposed in the aforementioned reference signal hopping method for massive connectivity. In the reference signal hopping method for massive connectivity, the reference signal hopping scheme based on a UE group has a difference in demodulation performance between groups. Since a reference signal of a group 1 can be received without interference, channel estimation performance can be guaranteed, and better reception performance can be expected due to a differential interference amount of each data symbol. For example, in FIG. 13, a $3^{rd}$ symbol of the group 1 is interfered only from a reference symbol of a group 2, and the reference symbol, which is known information, has excellent interference cancellation performance. On the other hand, a $5^{th}$ symbol of the group 2 is interfered from a data symbol of the group 1 and a reference symbol of a group 3, and thus demodulation performance may decrease. Even if iterative multi-group detection is performed, it can be expected that the greater the amount of interference, the lower the demodulation performance Therefore, since reception demodulation performance of a higher layer (e.g., the group 1 is a highest group) is excellent, data can be transmitted with a higher modulation and coding scheme (MCS) level, and a higher data rate can be expected even if the same resource is allocated. On the other hand, since reception demodulation performance of a lower group (e.g., a group 5 is a lowest group) is low, data is to be transmitted with a low MCS level.

In addition, the higher group can transmit more data symbols, and the lower group needs to transmit less data symbols than the higher group due to the use of a null symbol for detecting a reference symbol. Therefore, UE scheduling and UE grouping are necessary in consideration of an MCS level between groups and a data rate that can be provided.

Group Grouping Method 1

An eNB may allocate a UE having a great amount of transmission traffic to a higher group and allocate a UE having a small amount of transmission traffic to a lower group according to a scheduling request (SR) of the UE and a required data rate. Herein, since the amount of transmission traffic is transmitted by the UE to the eNB by being included in a buffer state report (BSR) through a data channel (e.g., a physical uplink shared channel (PUSCH)), the eNB can recognize a traffic amount. The BSR can be transmitted as a regular BSR, a periodic BSR, or a padding BSR.

Group Grouping Method 2

An eNB may configure a group of UEs having a similar timing distance according to a timing distance of a UE. The timing distance may be determined according to not only a physical distance but also a propagation delay caused by a multi-path of the UE or a system environment. In this case, a UE group with a great timing distance may be allocated to a higher group to guarantee a data rate.

Group Grouping Method 3

An eNB may group UEs on the basis of a fairness index of the UE. Users having a low fairness index of the UE may be allocated to a higher group to ensure fairness. In this case, the fairness index may be determined based on the existing proportional fairness, and may be defined through other fairness indices. For example, various indices such as Jain's Fairness Index, Max-min Fairness, or the like may be used. When the group grouping scheme proposed in the present invention is used, UE grouping fairness of the non-orthogonal multiple access scheme can be supported.

Hereinafter, the aforementioned UE grouping information exchange and a procedure of handling a reference signal hopping pattern invention 1 for massive connective will be exemplified as follows.

Figure 17:
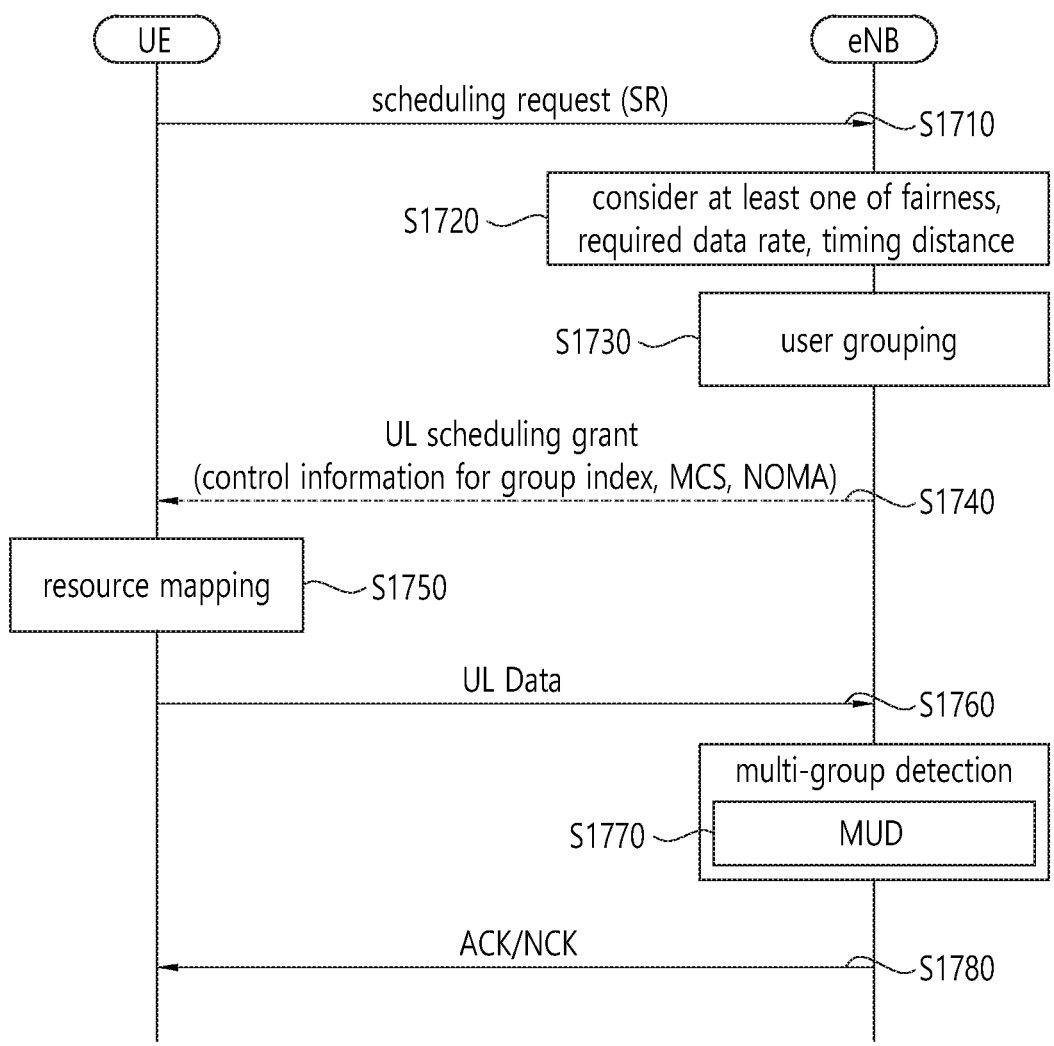
FIG. 17 illustrates an example of a procedure for a massive sporadic packet service.

FIG. 17 illustrates an example of a procedure for a massive sporadic packet service.

A structure of a non-orthogonal multi-group multiple access scheme is exemplified in FIG. 17. A UE may deliver its uplink traffic transmission request to an eNB through a scheduling request (SR) signal (S1710). The eNB may perform scheduling based on the aforementioned group grouping method (e.g., the group grouping methods 1, 2, and 3) according to a channel environment of the UE and a state of another UE (S1720). In addition, the eNB performs UE grouping on the basis of at least one of the aforementioned group grouping methods (e.g., the group grouping methods 1, 2, and 3) (S1730). When a non-orthogonal multiple access group of the UE is determined, unlike in the legacy system, a group index, control information for non-orthogonal multiple access (e.g., power allocation information for MUST, a codebook index for SCMA, an interleaver index for IDMA, or the like), an MCS level, or the like may be transmitted to the UE through an uplink scheduling grant (e.g., UL grant) of a control channel (e.g., a physical downlink control channel (PDCCH)) (S1740). Herein, a reference signal hopping pattern may be predefined in a cell-specific manner, or the eNB may inform the UE of a reference signal hopping pattern index by including it into a UL grant. In addition, the MCS level may be defined on a group basis or may be determined in a user-specific manner.

The UE may transmit UL data to the eNB by mapping a data symbol and a reference symbol to a resource on the basis of the resource allocation information and the group index included in the UL grant (S1750 and S1760). The eNB performs iterative demodulation on a multi-group, and demodulates a signal of a multi-group multi-UE by performing MUD in the demodulation of each group (S1770). The eNB transmits an ACK or NACK feedback signal to the UE on the basis of the demodulated signal (S1780).

As described above, the non-orthogonal multi-group multiple access scheme capable of performing demodulation can be performed while supporting at least the maximum number of reference symbols based on a sequence. Although it is described in the present invention that a transmitting entity is a UE and a receiving entity is an eNB on the basis of an uplink, it is obvious that the present invention can be applied according to a disposition of a data channel (PDSCH) and cell-specific RS of a downlink.

Hereinafter, a self-contained frame having a frame structure proposed in new RAT (NR) will be described.

Figure 18:
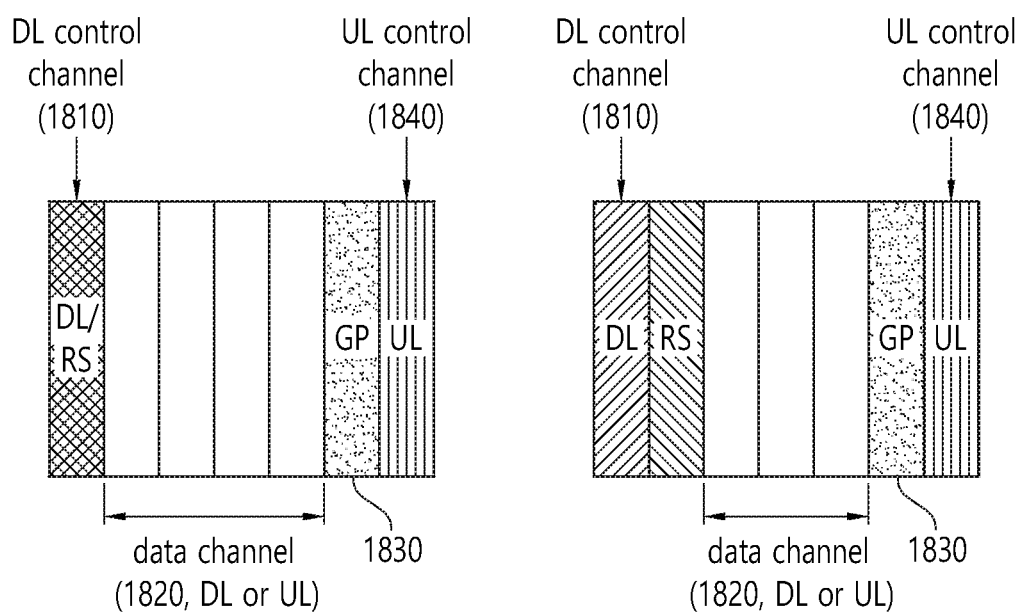
FIG. 18 illustrates an example of a self-contained subframe structure according to an embodiment of the present specification.

FIG. 18 illustrates an example of a self-contained subframe structure according to an embodiment of the present specification.

It is expected to provide a data transfer latency of 1 ms as a low-delay requirement of a next-generation wireless communication system. A structure of a self-contained frame in which a downlink control channel and an uplink control channel are always present in a single subframe has been proposed to secure the data transfer latency of 1 ms. As shown in FIG. 18, the structure of the self-contained frame is characterized in that a control channel and a data channel are subjected to time division. Referring to FIG. 18, a DL control channel 1810 capable of transmitting DL control information, DL synchronization signals, system information, or the like, a data channel 1820 capable of transmitting DL or UL data, a UL control channel 1840 capable of transmitting UL control information, UL synchronization signals, or the like, and a guard period (GP) 1830 between the data channel and the UL control channel may be disposed in a TDM manner A reference signal (RS) may be transmitted by being included in the DL control channel 1810 as shown in the left side of FIG. 18, or may be transmitted on a first symbol except for a control channel as shown in the right side of FIG. 18.

In addition, in order to achieve the low latency requirement, unlike in the UL DMRS proposed in the legacy LTE as shown in FIG. 10, a reference signal in a self-contained subframe is preferably positioned in a first symbol of a data zone or a control zone. Therefore, it is necessary to define partially overlapping of a reference signal suitable for the self-contained subframe. It is also necessary to define partially overlapping of a reference signal considering contention-based multiple access (MA). It is also necessary to define partially overlapping of data suitable for the self-contained subframe and to define partially overlapping of data considering contention-based MA.

In addition, although it is described in the aforementioned scheme that a time domain is partially overlapped, the proposed scheme described below considers all of time, frequency, code, and constellation domains.

The present invention proposes a scheme for partially overlapping a reference signal suitable for a self-contained subframe. In addition, the present invention proposes a scheme for partially overlapping a reference signal by considering contention-based MA. The present specification proposes frequency, time, code, and constellation domains, instead of limiting the partially overlapping scheme to a time domain of the existing scheme. Although the present specification is described based on non-orthogonal coded multiple access (NCMA), it does not mean to exclude descriptions based on another NOMA scheme. When it is replaced with another NOMA scheme, it may be understood that the overlapping scheme is simply changed. Hereinafter, a multi-user overlapping scheme to which various NOMA schemes are applied is described.

1. DC-NCMA (Density Control NCMA)

The present specification proposes a reference signal and data pattern of partially overlapping NOMA (POMA) on the basis of a reference signal of a self-contained subframe in a POMA scheme. In order to achieve a low latency which is one of characteristics of a self-contained subframe considered in NR as described above, a reference signal is preferably positioned in a first symbol of a data zone or a control zone. Therefore, an uplink reference signal pattern in the legacy LTE to which the POMA scheme is applied may be changed as shown in FIG. 19.

Figure 19:
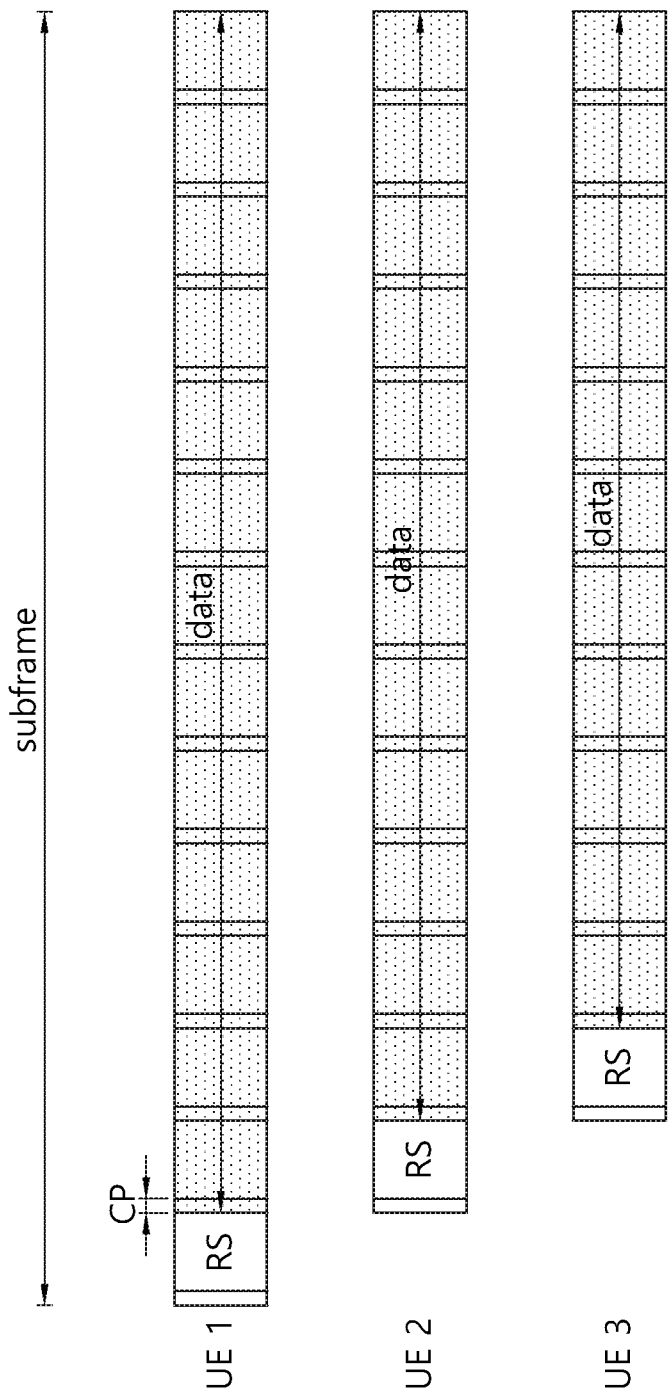
FIG. 19 illustrates an example of a data pattern and a reference signal based on a self-contained subframe structure according to an embodiment of the present invention.

FIG. 19 illustrates an example of a data pattern and a reference signal based on a self-contained subframe structure according to an embodiment of the present invention.

Referring to FIG. 19, a UE1 to a UE3 illustrated herein may also be represented as user groups 1 to 3 as shown in FIG. 13. As described in FIG. 13, a reference signal (RS) of a UE1 (or group 1) can be received without interference. On the basis of this, channel estimation is performed and thereafter data decoding is performed. In addition, a first symbol of a self-contained subframe for a UE2 is nulled to reduce influence of interference to the RS of the UE1.

As a known sequence based on decoded data of the UE1 (or group 1), detection (or decoding) is performed in a state where the decoded data of the UE1 (or group 1) is removed from an RS of the UE2 (or group 2). In the same manner, data of the UE2 (or group 2) is decoded based on channel estimation through the decoded data of the UE1 (or group 1) and the RS of the UE2 (or group 2). In addition, first and second symbols of a self-contained subframe for the UE2 are nulled to reduce influence of interference to the RSs of the UE1 and UE2. In the same manner, iterative detection may be performed on entire UE classes or user groups.

In this scheme, since a UE or user group's reference signal which is first decoded in the MUD scheme such as MMSE-IRC, SIC, or the like is not interfered, a decoding rate can be increased when the MUD is performed sequentially. Assuming contention-based transmission, since all UEs (or user groups) have the same transmission data size, in this case, the UE1 may be allowed to perform transmission with a lower code rate than the UE2 and the UE3. When all UEs (or user groups) have different data sizes, the UE1, the UE2, and the UE3 may have the same or different code rates. When the contention-based transmission does not have a hierarchical structure in the same unit, it may be expressed as shown in FIG. 20.

Figure 20:
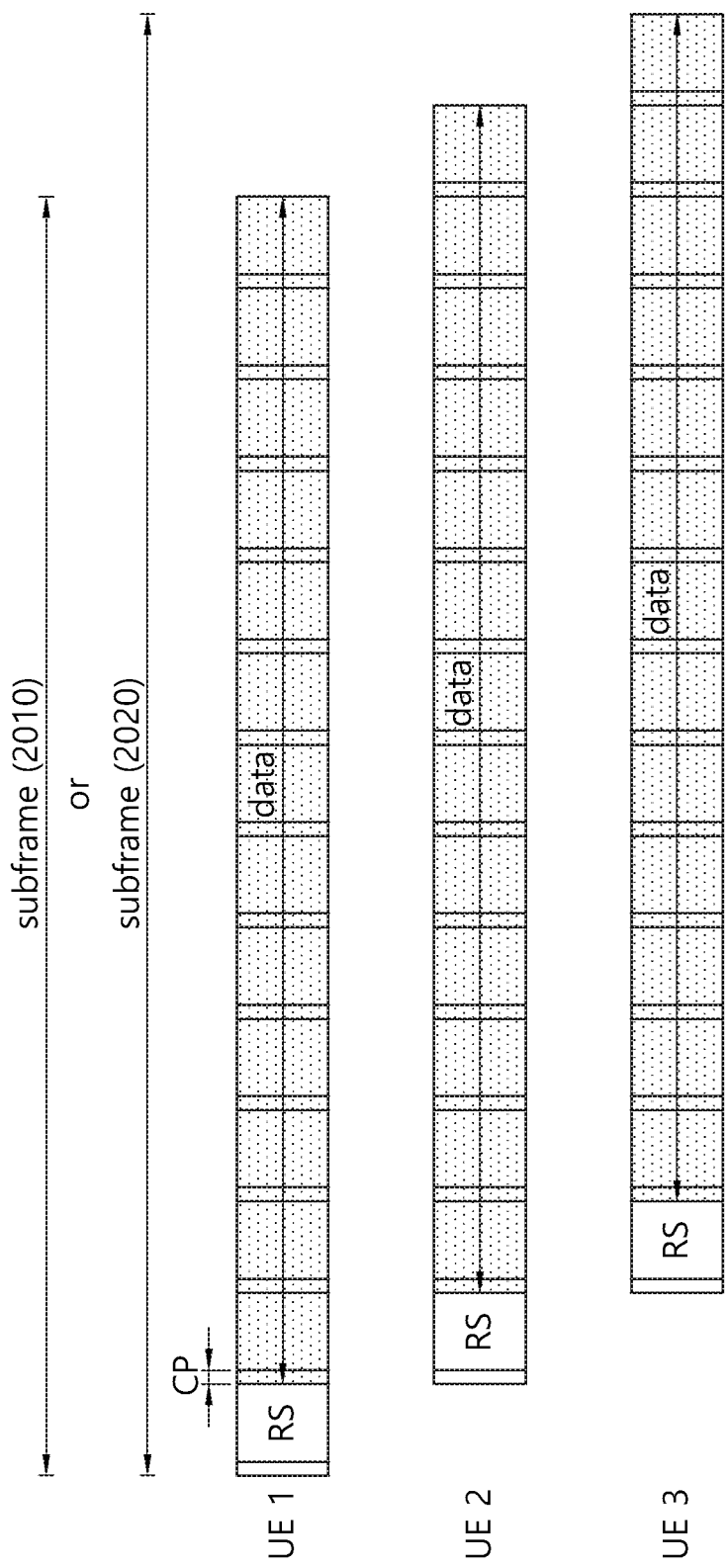
FIG. 20 illustrates another example of a reference signal pattern and data pattern based on a self-contained subframe structure according to an embodiment of the present specification.

FIG. 20 illustrates another example of a reference signal pattern and data pattern based on a self-contained subframe structure according to an embodiment of the present specification.

Referring to FIG. 20, two cases are illustrated, that is, a case 2010 where a resource used by a UE1, a UE2, and a UE3 in a multiple overlapping manner has an allocation pattern of a reference signal and data beyond a subframe unit and a case 2020 where the resource has an allocation pattern of a reference signal and data in a subframe.

In the case 2010 where the resource used by the UE1, the UE2, and the UE3 in the multiple overlapping manner is allocated beyond the subframe unit, a first symbol of a self-contained subframe for the UE2 is nulled to reduce influence of interference to a reference signal of the UE1, and first and second symbols of a self-contained subframe for the UE3 are nulled to reduce influence of interference to reference signals of the UE1 and the UE2. Unlike in FIG. 19, in FIG. 20, all UEs can transmit data of the same size since this is a case beyond the subframe unit.

In addition, in the case 2020 where the resource used by the UE1, the UE2, and the UE3 in the overlapping manner is allocated in the subframe, last two symbols of the self-contained subframe for the UE1 are nulled. In addition, a last symbol of a self-contained subframe for the UE2 is also nulled. Likewise, a first symbol of the self-contained subframe for the UE2 is nulled to reduce influence of interference to the reference signal of the UE1, and first and second symbols of a self-contained subframe for the UE3 are nulled to reduce influence of interference to reference signals of the UE1 and the UE2.

In the operation of FIG. 20, slotted ALOHA in which a channel is divided for each time slot to reduce a collision risk is used, and a receiver (eNB) can decode data sequentially on the basis of detection (or decoding) of a first UE (or user group). Although FIG. 20 is shown based on a symbol offset in a subframe, it is obvious that multi-user overlapping is possible while hierarchically providing reliability of a reference signal through a slot offset or a subframe offset. In addition, although the aforementioned operation is represented by a symbol offset beyond one subframe unit, it includes a case where all reference signals and data overlap in one subframe. That is, the UEs 1 to 3 of FIG. 20 exist in one subframe. Although the UEs 1 to 3 are represented as a single user in the aforementioned scheme, the UEs 1 to 3 may be replaced with UE groups 1 to 3, and each UE group may represent a set of symbols overlapping in a multi-user overlapping manner.

Density mentioned in the present specification indicates a level of a reference signal and data occupied by each user in a reference resource region. Therefore, it may be defined as a UE-specific (or user group-specific) density pattern. Signaling for the UE-specific (or user group-specific) density pattern is defined as follows.

An index for the UE-specific (or user group-specific) density pattern may be transmitted by being tied with different UE-specific information. For example, it may be tied with a UE-specific codeword for a NOMA scheme or an indication index for spreading or interleaving patterns, or the like (e.g., UE-specific NCC).

The index for the UE-specific (or user group-specific) density pattern may be predefined in an RRC connection step.

The index for the UE-specific (or user group-specific) density pattern may be indicated using a control channel according to generation of UL or DL data traffic (e.g., it is included in a DCI format of a PDCCH).

Data transmission may be performed without transmission of the index for the UE-specific (or user group-specific) density pattern. In this case, the index for the UE-specific (or user group-specific) density pattern may be transmitted to a receiver by being randomly selected by a user. In this case, the receiver verifies a pattern through blind detection by allowing to-be-transmitted data to include information on a CRC check.

Although the UE-specific (or user group-specific) density pattern is identical for a plurality of users in the above schemes, another reference domain may also be possible. In this case, the aforementioned slotted ALOHA operation may be performed. In this case, the UE-specific (or user group-specific) density pattern may be predefined and broadcast (e.g., it may be transmitted as MIB information or SIBx information).

Although the reference unit is described as the subframe in the above schemes, the reference unit of the level of hierarchical overlapping may be various such as a symbol, slot, subframe, frame, or the like in the time domain.

Although the reference domain is described as the time domain in the above schemes, the reference domain may be various such as a subframe, subband, band, or the like of the frequency domain.

2. BC-NCMA (Bandwidth and/or Time Control NCMA)

The present specification proposes that, when multiple users overlap in a time/frequency domain, a size thereof differs depending on a user. The user has a user-specific resource region in a reference frequency band or a time symbol. Herein, the users have resource regions each having a different size, and the resource regions may have different positions. For example, this may be exemplified as shown in FIG. 21.

Figure 21:
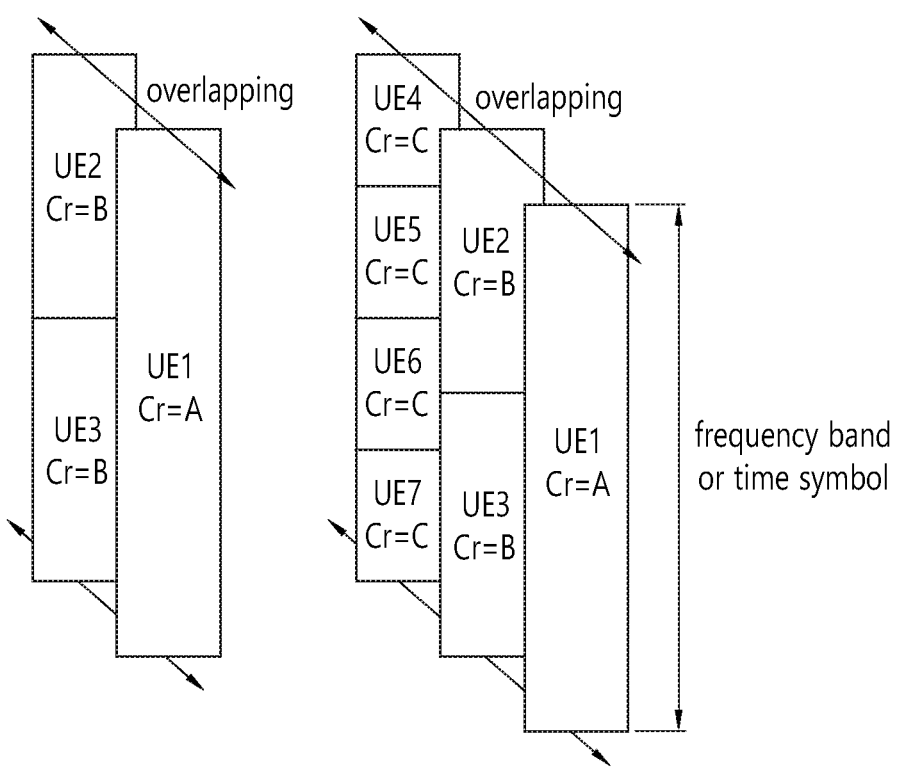
FIG. 21 illustrates an example of an overlapping resource used by multiple users in a frequency band or a symbol according to an embodiment of the present specification.

FIG. 21 illustrates an example of an overlapping resource used by multiple users in a frequency band or a symbol according to an embodiment of the present specification.

A case where multiple users overlap in a reference frequency band or a time symbol is shown in FIG. 21. Herein, Cr denotes a code rate. A, B, and C may be equal to or different from each other, and may be related as $A \leq B \leq C$. Ordering of A, B, and C may vary depending on an operating scheme.

A case where three users (UEs 1 to 3) overlap in one frequency band or time symbol is shown in the left side of FIG. 21. The UE 1 transmits data to the entire reference domain with a code rate A, and the UEs 2 and 3 transmit data with a code rate B in part of the reference domain.

In the same manner, overlapping for seven users (UEs 1 to 7) may be exemplified in the right side of FIG. 21. Herein, if the code rate A of the UE 1 has a smaller value than a code rate of other users, a receiver may first decode data of the UE1, and may perform interference cancellation by using a known sequence when decoding data of the UE2 on the basis of the decoded signal. There is a difference in a coding gain on the basis of a hierarchical structure of the code rate and a UE-specific resource region. Therefore, a decoding success rate can be increased when the interference cancellation is performed sequentially.

Signaling for the UE-specific resource region may be defined as follows.

An index for the UE-specific resource region may be transmitted by being tied with different UE-specific information. For example, it may be tied with a UE-specific codeword for a NOMA scheme or an indication index for spreading or interleaving patterns, or the like (e.g., UE-specific NCC).

The index for the UE-specific resource region may be predefined in an RRC connection step.

The index for the UE-specific resource region may be indicated using a control channel according to generation of UL or DL data traffic (e.g., it is included in a DCI format of a PDCCH).

Data transmission may be performed without transmission of the index for the UE-specific resource region. In this case, the index for the UE-specific resource region may be transmitted to a receiver by being randomly selected by a user. In this case, the receiver verifies a resource region through blind detection by allowing to-be-transmitted data to include information on a CRC check.

In the specification described above, an overlapping level of the UE may differ.

For example, in the left side of FIG. 21, only the UEs 1 and 2 may overlap (in the absence of the UE 3). In this case, although there is no change in a level of interference caused by the overlapping of the UE 2, since the UE 1 is interfered from the UE 2 but is not interfered from the UE 3, a decoding success rate of the UE 1 is increased. Therefore, a decoding success rate of data of the entire overlapping users can be increased by first decoding the UE 1 and then decoding the UE 2.

In the same manner, a decoding order may be determined by differentiating an overlapping level in the right side of FIG. 21. Interference cancellation may be performed sequentially in such a manner that dada of a user with a small overlapping level is first decoded, and then the decoded data is cancelled.

Power of the UE may differ in the aforementioned embodiment.

For example, in the left side of FIG. 21, power per frequency tone (or subcarrier) (or power per time symbol) of the UEs 2 and 3 may be greater than power per frequency tone (or power per time symbol) of the UE 1. In this case, since a signal to interference ratio (SIR) of the UEs 2 and 3 is greater than an SIR of the UE1, decoding of the UE 2 or 3 is first performed, and interference cancellation is performed when decoding of the UE 1 is performed based on the decoded data. The above scheme may operate in an opposite decoding order when higher power is allocated to the UE 1 and lower power is allocated to the UEs 2 and 3.

The above scheme can be achieved in the same manner through differential power allocation, even if an overlapping level is high as in the right side of FIG. 21.

Although UE x is represented as a single user in the aforementioned invention, it may be replaced with UE group x. Each UE group may represent a set of symbols overlapping in a multi-user overlapping manner.

In addition, control of overlapping density and control of a UE-specific resource region may be simultaneously used by combining the aforementioned NOMA schemes 1 and 2.

Figure 23:
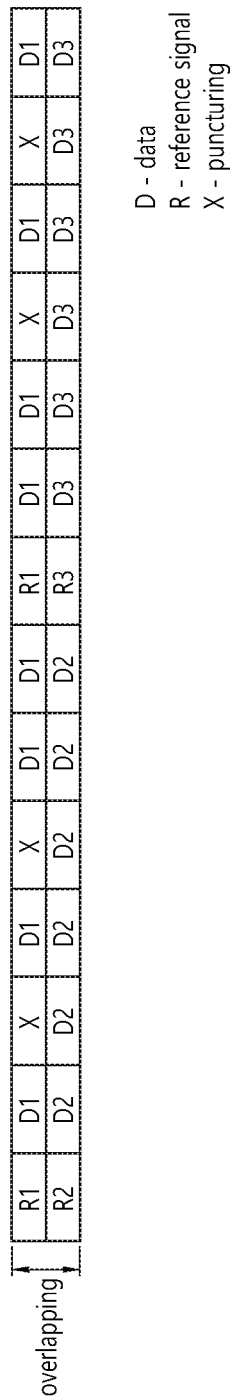
FIG. 23 illustrates another example of controlling a UE-specific resource region by considering a reference signal pattern and a data pattern according to an embodiment of the present specification.
Figure 24:
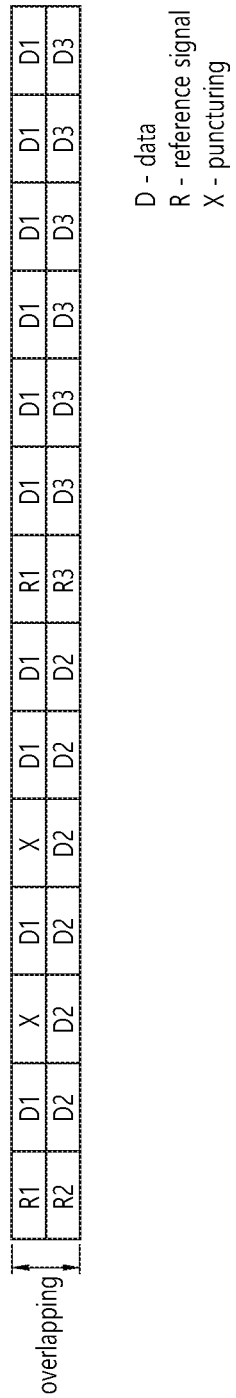
FIG. 24 illustrates another example for controlling a UE-specific resource region by considering a reference signal pattern and a data pattern according to an embodiment of the present specification.

For example, depending on the advanced receiver types, a puncturing rate of a user 1 may be controlled after assigning asymmetric bandwidth and energy per RE (EPRE) between users. In this case, the user 1 is likely to have a wider resource region. For example, when three users overlap, it may be exemplified as shown in FIG. 22 to FIG. 24.

Figure 22:
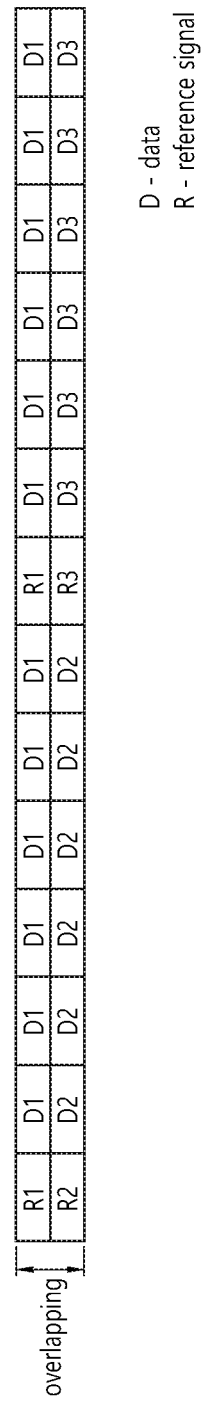
FIG. 22 illustrates an example of controlling a UE-specific resource region by considering a reference signal pattern and a data pattern according to an embodiment of the present specification.

FIG. 22 illustrates an example of controlling a UE-specific resource region by considering a reference signal pattern and a data pattern according to an embodiment of the present specification.

A pattern of a reference signal and data to which a partially overlapping NOMA (POMA) scheme is applied and a case where multiple users overlap in a frequency band or a time symbol are both illustrated in FIG. 22. In a UE 1, patterns R1 and D1 are allocated in the entire band or the entire symbol. In UEs 2 and 3, patterns (R2, D2 and/or R3, D3) are allocated respectively in the half of the entire bands or the half of the entire symbols.

If successive interference cancellation (SIC) is performed in the receiver, the receiver may perform successive interference cancellation by first decoding data of the UE 1, and then decoding data of the UE 2 and the UE 3 through cancellation for the decoded data.

FIG. 23 illustrates another example of controlling a UE-specific resource region by considering a reference signal pattern and a data pattern according to an embodiment of the present specification.

A pattern of a reference signal and data to which a partially overlapping NOMA (POMA) scheme is applied and a case where multiple users overlap in a frequency band or a time symbol are both illustrated in FIG. 23. In a UE 1, patterns R1 and D1 are allocated in the entire band or the entire symbol. In UEs 2 and 3, patterns (R2, D2 and/or R3, D3) are allocated respectively in the half of the entire bands or the half of the entire symbols.

If symbol-level maximum likelihood (ML) or parallel decoding is performed in a receiver, the receiver uses puncturing to decode data of the UE 1. That is, it is a method in which the UE 1 punctures part of a band or a symbol to transmit a reference signal or data instead of using the entire band or the entire symbol, so that interference does not occur when the receiver decodes data of the UE 2 and the UE 3.

That is, the UE 1 with good reliability increases reliability of part of data of the UE 2 and the UE 3 while compromising its reliability to balance overall reliability. This is because the symbol-level ML or the parallel decoding is a decoding scheme used when reliability of the UE is similar to those of the UE 2 and the UE 3.

FIG. 24 illustrates another example for controlling a UE-specific resource region by considering a reference signal pattern and a data pattern according to an embodiment of the present specification.

A pattern of a reference signal and data to which a partially overlapping NOMA (POMA) scheme is applied and a case where multiple users overlap in a frequency band or a time symbol are both illustrated in FIG. 24. In a UE 1, patterns R1 and D1 are allocated in the entire band or the entire symbol. In UEs 2 and 3, patterns (R2, D2 and/or R3, D3) are allocated respectively in the half of the entire bands or the half of the entire symbols.

If SIC is performed in a receiver, the receiver uses puncturing to decode data of the UE 1. Herein, the UE 1 intends to balance reliability with the UE 2 by puncturing part of a band or a symbol to transmit a reference signal or data instead of using the entire band or the entire symbol. Since the UE 1 does not perform puncturing on a resource overlapping with the UE 3, the UE 3 is interfered and thus is expected to have lower reliability than the UE 1 and the UE 2.

In this case, since the UE 1 and the UE 2 have similar reliability, the receiver performs parallel decoding on data of the UE 1 and the UE 2. After the data of the UE 1 and the UE 2 is decoded, data of the UE 3 having lowest reliability may be detected by performing SIC.

Although the aforementioned invention has been described in terms of UL, it may also be equally applied to DL. In the DL, control of a puncturing rate shall be based on a UE capability report of an advanced receiver type. For example, if the UE 3 is SIC capable but the UE 2 is not, a sub-region based on non-uniform puncturing of the UE 1 may be useful in FIG. 24.

3. CC-NCMA (Constellation and/or Coding Rate Control NCMA)

The present embodiment proposes a multi-user overlapping scheme in which a modulation or coding rate level is changed depending on a resource.

3.1 Hierarchical Modulation Order Based NCMA

The present specification proposes a scheme in which the same data rate is provided for the same resource region through a UE-specific modulation pattern (or user-specific modulation pattern), while a modulation order is changed. It is assumed that data of multiple users overlaps in the same resource region through a NOMA scheme (e.g., NCMA). In this case, data is transmitted with a hierarchical modulation order for each resource element on the basis of the UE-specific modulation pattern. For example, transmission can be performed as shown in FIG. 25.

Figure 25:
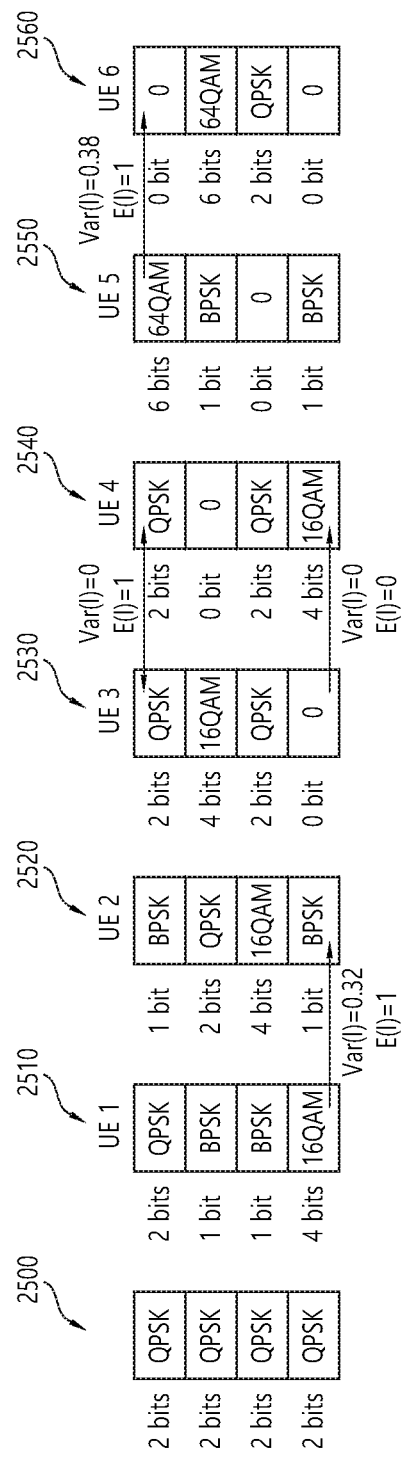
FIG. 25 illustrates an example in which a modulation order varies through a UE-specific modulation pattern for a NOMA scheme according to an embodiment of the present specification.

FIG. 25 illustrates an example in which a modulation order varies through a UE-specific modulation pattern for a NOMA scheme according to an embodiment of the present specification.

Referring to FIG. 25, in the existing scheme 2500, for the leftmost four resource elements, each resource element transmits data of 2 bits through QPSK. In the proposed schemes 2510, 2520, 2530, 2540, 2550, and 2560, a different modulation order is used for each resource element as shown in the structure of UEs 1 to 6 of FIG. 25.

For example, the UE 1 transmits data of 2 bits by using QPSK in a first resource element, but transmits data of 1 bit by using BPSK in a second resource element. In the same manner, a third resource element and a fourth resource element can transmit data of 1 bits and 4 bits, respectively, by using BPSK and 16QAM, respectively. The modulation order pattern may be defined as a UE-specific modulation pattern.

In the scheme 2510, data transmitted by the UE 1 is 2 bit+1 bit+1 bit+4 bit=8 bit, which is the same as 2 bit*4=8 bit of the existing scheme 2500. The above example is fixed to "Transmission bits/User=8 bits per 4RE". Therefore, overlapping transmission based on hierarchical modulation is possible without a change in a data rate. On the other hand, without having to fix the Transmission bits/User, a different modulation pattern may be used when multiple users have a different Transmission bits/User.

In FIG. 25, Var(I) denotes an interference power variance of MUI, and E(I) denotes expected interference power of MUI. If multiple users overlap based on NOMA in transmission, there may be a changed in an expected value of power and variance value of power with respect to an MUI value of each resource element according to a difference of a UE-specific modulation order.

For example, in case of a fourth resource element for modulation patterns 2510 and 2520 of the UE1 and UE2 of FIG. 25, a value E(I) from the UE1 to the UE2 may be fixed to 1, whereas a value Var(I) may be 0.32 (Var(I)=E(I)^2−E(I^2), where I is modulated according to an information bit and there is a difference in power of constellation). In the above example, in case of a first resource element of the UE3 and UE4, a value E(I) between the UE3 and the UE4 may be fixed to 1, and a value Var(I) may be 0. In the above example, in case of a fourth resource element for modulation patterns 2530 and 2540 of the UE3 and UE4, a value E(I) from the UE4 to the UE3 is 0, and a value Var(I) is 0. In the above example, in case of a first resource element for modulation patterns 2550 and 2560 of the UE5 and UE6, a value E(I) from the UE5 to the UE6 may be fixed to 1, whereas a value Var(I) may be 0.38.

Therefore, since an expected value and variance value of interference may vary for each UE pair according to a UE-specific modulation pattern of each user, diversity can be obtained in terms of interference while an interleaved coded bit stream is modulated. That is, a level of interference to each user differs depending on modulation constellation formed by a coded bit. In addition, an interleaver for the aforementioned interleaved coded bit stream may vary depending on a user. Therefore, a level of the interference can be exhibited in various patterns with respect to the information bit by the UE-specific interleaver. In this manner, MUD performance of a receiver can be increased through interference distribution for multi-user overlapping transmission.

In the above embodiment, average power of transmission frequency tones may be identical irrespective of constellation based on each modulation pattern. In this case, as shown in FIG. 25, an expected value of MUI depending on multi-user overlapping is constant to 1 (E[I]=1, except for a case where 0 is carried on a tone).

In the above embodiment, average power of constellation based on each modulation pattern may vary. For example, in the above figure, power per frequency tone (or power per symbol) of QPSK may be lower than power per frequency tone (or power per symbol) of 16QAM. For example, it is assumed that average constellation power of 16QAM is two times higher than average constellation power of QPSK. In this case, an expected value of MUI depending on multi-user overlapping may be 2(E[I]=2) from 16QAM to QPSK, or 1(E[I]=1) from QPSK to 16QAM. That is, since high reliability is provided to a high modulation order, reliability for more information bits may be provided, thereby increasing reliability of the entire data.

In this case, since SIR of the UEs 2 and 3 is greater than an SIR of the UE 1, decoding of the UE 2 or 3 is first performed, and interference cancellation is performed when decoding of the UE 1 is performed based on the decoded data. The above scheme may operate in an opposite decoding order when higher power is allocated to the UE 1 and lower power is allocated to the UEs 2 and 3. The above scheme can be achieved in the same manner through differential power allocation, even if an overlapping level is high as in the right side of FIG. 21.

The aforementioned modulation pattern is exemplified as shown in Table 3 below. That is, Table 3 shows the modulation pattern of FIG. 25. The example of Table 3 below shows a case where the modulation pattern is applied in unit of 4 resource elements (REs), a reference modulation order is QPSK, and transmission of 8 bits (2 bit*4) is performed in 4 REs. In the following description, 'X' denotes that a modulation symbol is not transmitted. That is, it means that interference is cancelled by transmitting a null symbol.

TABLE 3

| Modulation Pattern Index | RE 1 | RE 2 | RE 3 | RE 4 |
|---|---|---|---|---|
| 1 | QPSK | BPSK | BPSK | 16QAM |
| 2 | BPSK | QPSK | 16QAM | BPSK |
| 3 | QPSK | 16QAM | QPSK | X |
| 4 | QPSK | X | QPSK | 16QAM |
| 5 | 64QAM | BPSK | X | BPSK |
| 6 | X | 64QAM | QPSK | X |
| ... | ... | ... | ... | ... |

Signaling for a UE-specific modulation pattern is defined as follows.

An index for the UE-specific modulation pattern may be transmitted by being tied with different UE-specific information. For example, it may be tied with a UE-specific codeword for a NOMA scheme or an indication index for spreading or interleaving patterns, or the like (e.g., UE-specific NCC).

The index for the UE-specific modulation pattern may be predefined in an RRC connection step.

The index for the UE-specific modulation pattern may be indicated using a control channel according to generation of UL or DL data traffic (e.g., it is included in a DCI format of a PDCCH).

Data transmission may be performed without transmission of the index for the UE-specific modulation pattern. In this case, the index for the UE-specific modulation pattern may be transmitted to the receiver by being randomly selected by a user. In this case, the receiver verifies a pattern through blind detection by allowing to-be-transmitted data to include information on a CRC check.

Figure 26:
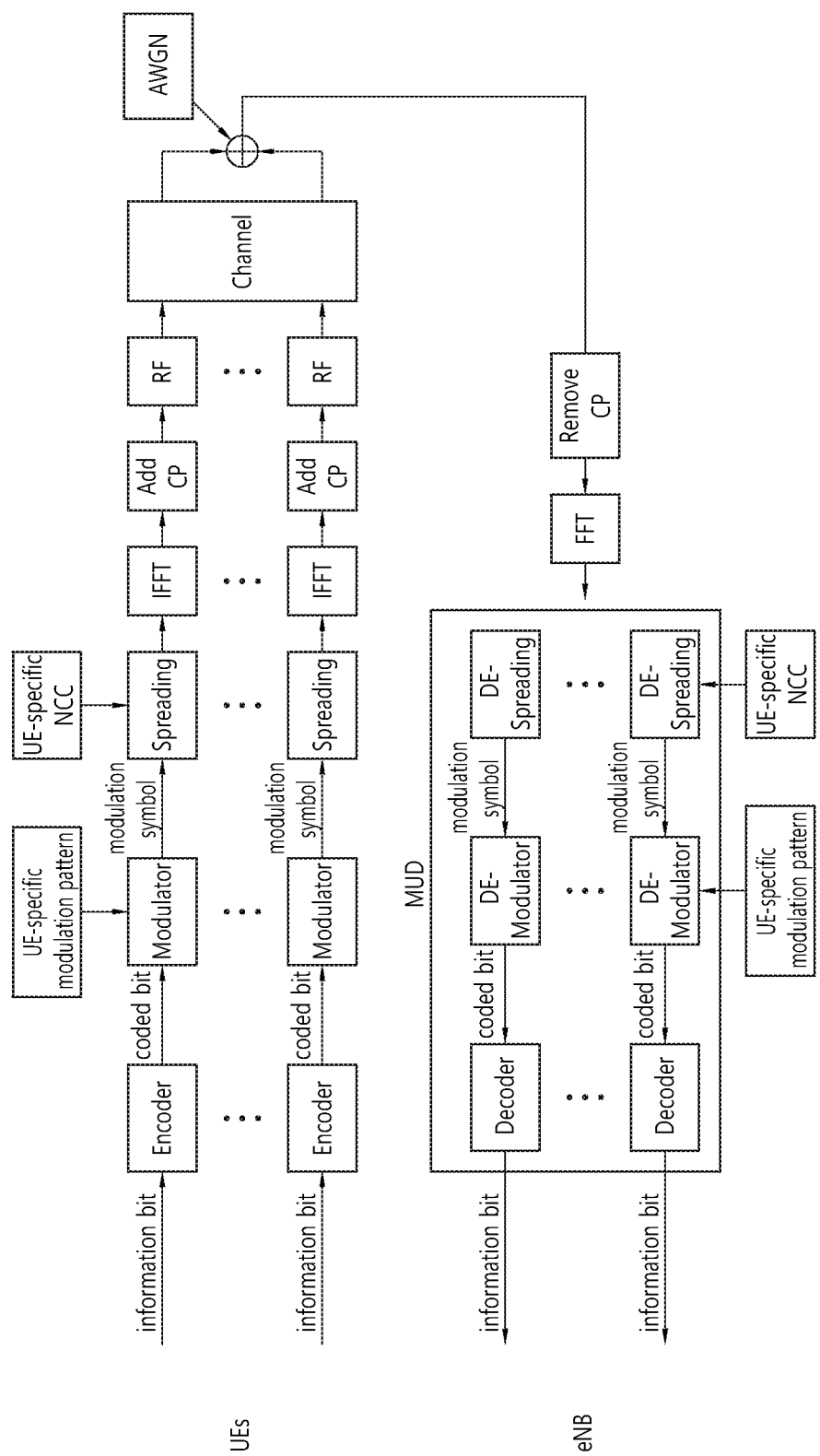
FIG. 26 illustrates an example of a structure of a transceiver considering a UE-specific modulation pattern for a NOMA scheme according to an embodiment of the present specification.

A transceiver considering the UE-specific modulation order may have a structure of FIG. 26.

FIG. 26 illustrates an example of a structure of a transceiver considering a UE-specific modulation pattern for a NOMA scheme according to an embodiment of the present specification.

Referring to FIG. 26, in a transmitter (UEs), an information bit may be modulated by using a UE-specific modulation order according to a UE-specific modulation pattern. In a receiver (eNB), although it is exemplified that single detection is performed in MUD, iterative cancellation (e.g., PIC, SIC, etc.) or ML approaches (e.g., MAP, MPA, etc.) or the like may be used, and the MUD may be performed based on the UE-specific modulation pattern information according to a receiver algorithm.

Although a resource element is exemplified herein, the aforementioned embodiment may be equally applied to a resource block unit, a bandwidth unit, a symbol unit, a spatial resource unit, or the like.

Although the above embodiment has been exemplified in a state where a Transmission bits/User is fixed, it is also applicable to a case where multiple users have a different "Transmission bits/User" without having to fix the Transmission bits/User. When the Transmission bits/User differs, a modulation pattern also differs, and thus a different modulation pattern and a different Transmission bits/User may be used.

Although UE x is represented as a single user in the aforementioned embodiment, it may be replaced with UE group x. Each UE group may represent a set of symbols overlapping in a multi-user overlapping manner.

3.2. Hierarchical Coding Rate Based NCMA

The present embodiment proposes a scheme in which the same data rate is provided for the same resource region through a UE-specific coding rate pattern (or user-specific coding rate pattern), while a coding rate is changed. It is assumed that data of multiple users overlaps in the same resource region through a NOMA scheme (e.g., NCMA). In this case, data is transmitted with a hierarchical coding rate for each resource element on the basis of a UE-specific coding rate pattern. The UE-specific coding rate pattern may be applied as shown in FIG. 27 similarly to the description of the UE-specific modulation order of the embodiment 3.1.

Figure 27:
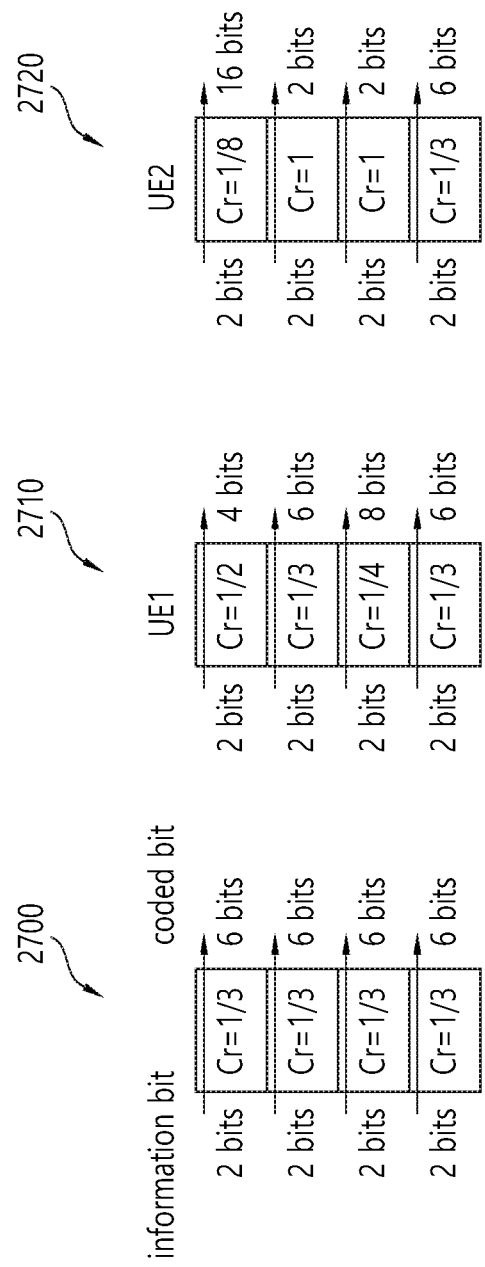
FIG. 27 illustrates an example in which a code rate varies through a UE-specific coding rate pattern for a NOMA scheme according to an embodiment of the present specification.

FIG. 27 illustrates an example in which a code rate varies through a UE-specific coding rate pattern for a NOMA scheme according to an embodiment of the present specification.

Referring to FIG. 27, in the existing scheme 2700, for the same coding rate in the leftmost side, an information bit stream of 8 bits is transmitted as a coded bit stream of 24 bits. In the proposed schemes 2710 and 2720, a different coding rate is used for each of some regions of information bit streams as shown in the structure of UEs 1 to 2 of FIG. 27. Herein, Cr denotes a code rate.

In addition, a UE can obtain a different coding gain for each section of an information bit according to a UE-specific coding pattern of each user. Then, diversity can be obtained in terms of interference by a UE-specific bit interleaver or the like. That is, a level of interference to each user differs depending on a coded bit. In addition, the aforementioned interleaver may vary depending on a user. Therefore, a level of the interference can be exhibited in various patterns with respect to the information bit by the UE-specific interleaver. In this manner, MUD performance of a receiver can be increased through interference distribution for multi-user overlapping transmission.

The aforementioned coding rate pattern is exemplified as shown in Table 4 below. That is, Table 4 shows the modulation pattern of FIG. 26. The following example shows a case where the coding rate pattern is applied in unit of 4 segment blocks, a reference coding rate is 1/3, and transmission of 24 bits (6 bit*4) is performed in 4 segment blocks. According to a channel coding scheme, it may be performed in the unit (e.g., one block) other than the segment unit, and only an interleaver and an iterative bit domain may be used in configuration.

TABLE 4

| Coding rate Pattern Index | Block 1 | Block 2 | Block 3 | Block 4 |
|---|---|---|---|---|
| 1 | 1/2 | 1/3 | 1/4 | 1/3 |
| 2 | 1/8 | 1 | 1 | 1/3 |
| 3 | 1 | 1/4 | 1/3 | 1/4 |
| 4 | 1/4 | 1/2 | 1/4 | 1/2 |
| ... | ... | ... | ... | ... |

Signaling for the UE-specific coding rate pattern is defined as follows.

An index for the UE-specific coding rate pattern may be transmitted by being tied with different UE-specific information. For example, it may be tied with a UE-specific codeword for a NOMA scheme or an indication index for spreading or interleaving patterns, or the like (e.g., UE-specific NCC).

The index for the UE-specific coding rate pattern may be predefined in an RRC connection step.

The index for the UE-specific coding rate pattern may be indicated using a control channel according to generation of UL or DL data traffic (e.g., it is included in a DCI format of a PDCCH).

Data transmission may be performed without transmission of the index for the UE-specific coding rate pattern. In this case, the index for the UE-specific coding rate pattern may be transmitted to a receiver by being randomly selected by a user. In this case, the receiver verifies a pattern through blind detection by allowing to-be-transmitted data to include information on a CRC check.

Figure 28:
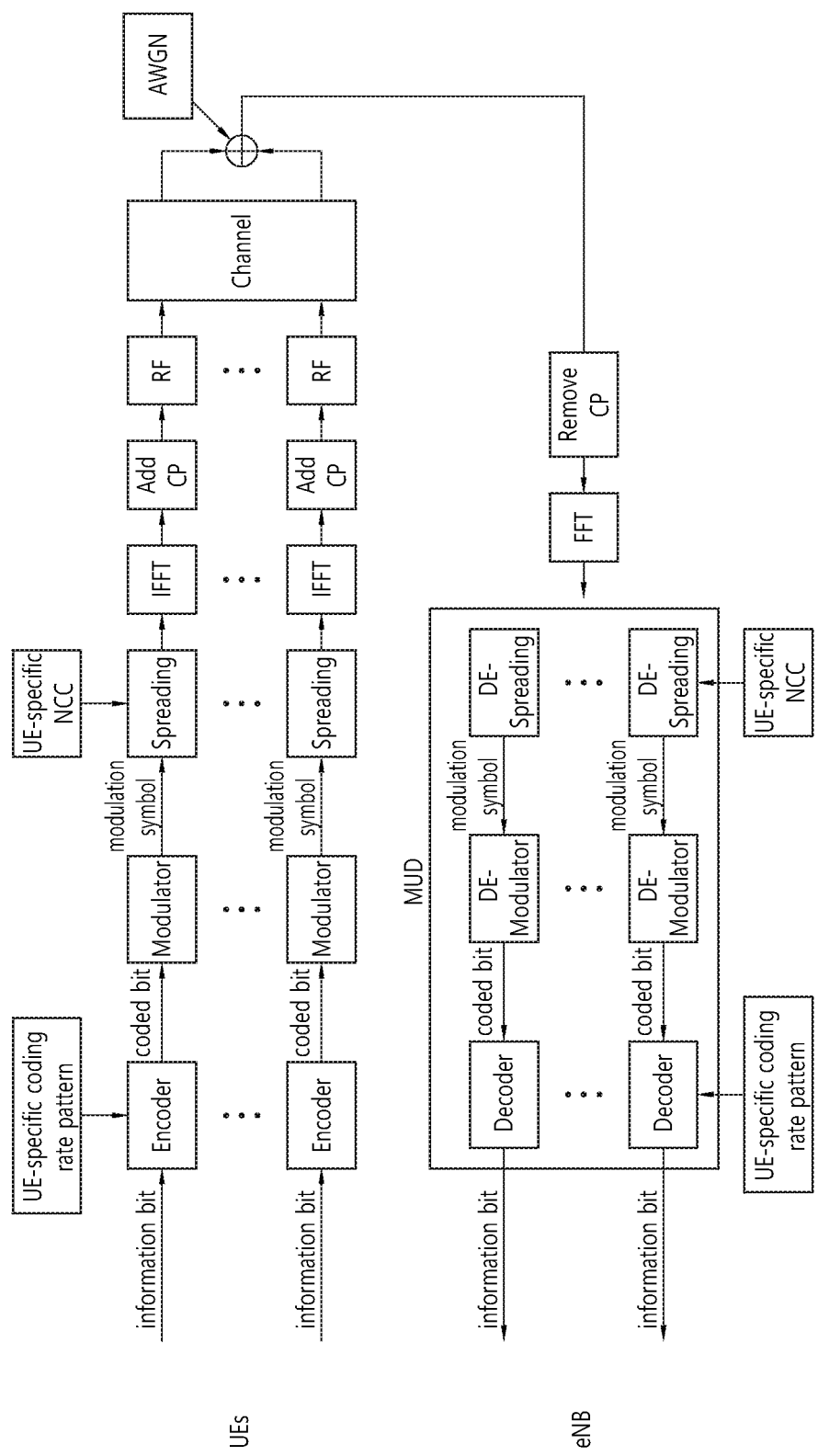
FIG. 28 illustrates an example of a structure of a transceiver considering a UE-specific coding rate pattern for a NOMA scheme according to an embodiment of the present specification.

A transceiver considering the UE-specific coding rate order may have a structure of FIG. 28.

FIG. 28 illustrates an example of a structure of a transceiver considering a UE-specific coding rate pattern for a NOMA scheme according to an embodiment of the present specification.

Referring to FIG. 28, in a transmitter (UEs), an information bit may be encoded by using a UE-specific coding rate order according to a UE-specific coding rate pattern. In a receiver (eNB), although it is exemplified that single detection is performed in MUD, iterative cancellation (e.g., PIC, SIC, etc.) or ML approaches (e.g., MAP, MPA, etc.) or the like may be used, and the MUD may be performed based on the UE-specific coding rate pattern information according to a receiver algorithm.

Although a resource element is exemplified herein, the aforementioned embodiment may be equally applied to a resource block unit, a bandwidth unit, a symbol unit, a spatial resource unit, or the like.

Although the above embodiment has been exemplified in a state where a Transmission bits/User is fixed, it is also applicable to a case where multiple users have a different Transmission bits/User without having to fix the Transmission bits/User. When the Transmission bits/User differs, a coding rate pattern also differs, and thus a different coding rate pattern and a different Transmission bits/User may be used.

Although UE x is represented as a single user in the aforementioned embodiment, it may be replaced with UE group x. Each UE group may represent a set of symbols overlapping in a multi-user overlapping manner.

3.3. Hierarchical Coding Rate and Modulation Based NCMA

The UE-specific modulation pattern and the UE-specific coding rate pattern may be simultaneously used by combining the above embodiments 3.1 and 3.2.

Figure 29:
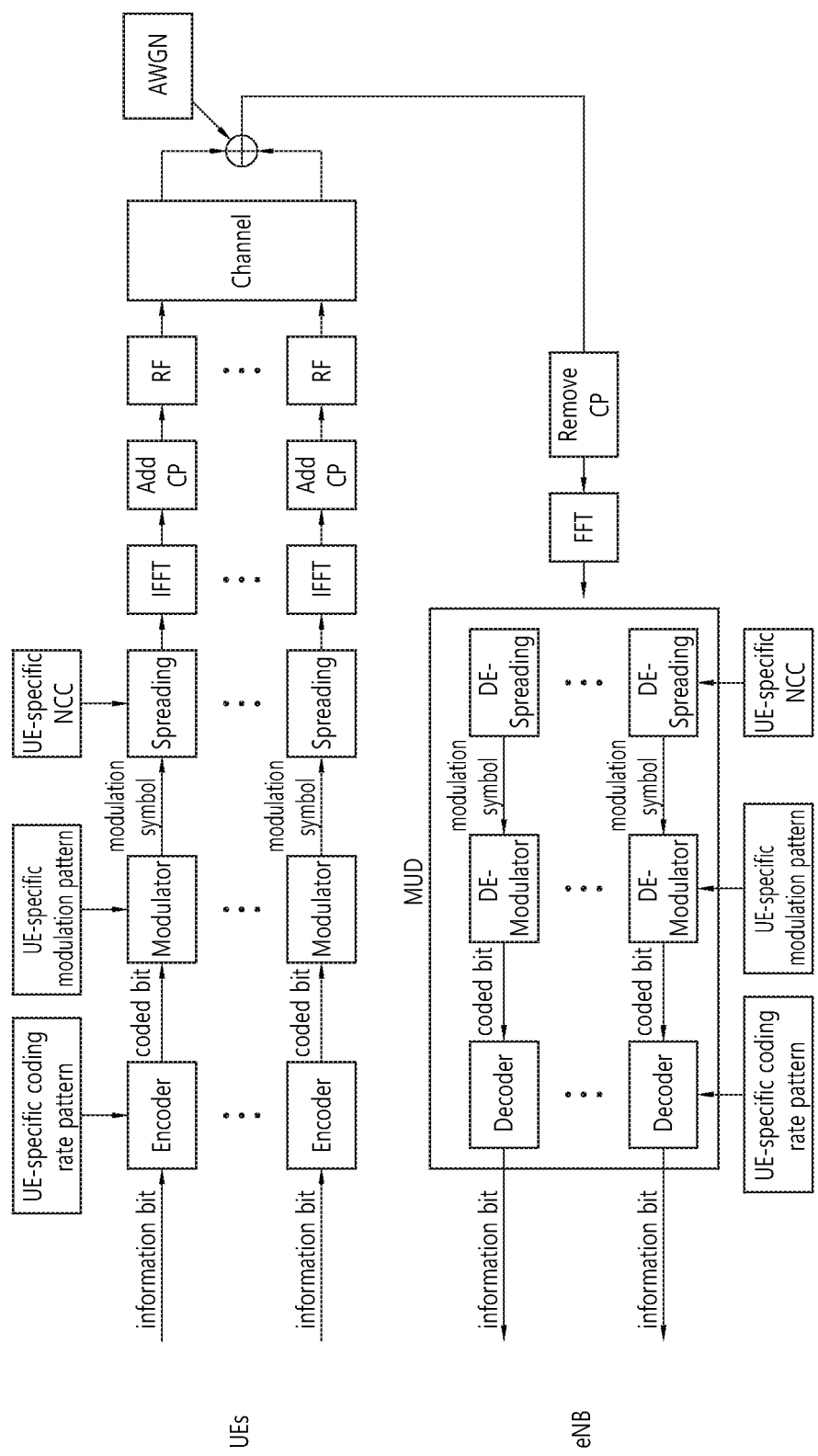
FIG. 29 illustrates an example of a structure of a transceiver considering a UE-specific modulation pattern and UE-specific coding rate pattern for a NOMA scheme according to an embodiment of the present specification.

A transceiver considering the UE-specific modulation order and the UE-specific coding rate order may have a structure of FIG. 29.

FIG. 29 illustrates an example of a structure of a transceiver considering a UE-specific modulation pattern and UE-specific coding rate pattern for a NOMA scheme according to an embodiment of the present specification.

Referring to FIG. 29, in a transmitter (UEs), an information bit may be encoded by using a UE-specific coding rate order according to a UE-specific coding rate pattern. The encoded bit may be modulated by using a UE-specific modulation order according to a UE-specific modulation pattern. In a receiver (eNB), although it is exemplified that single detection is performed in MUD, iterative cancellation (e.g., PIC, SIC, etc.) or ML approaches (e.g., MAP, MPA, etc.) or the like may be used, and the MUD may be performed based on the UE-specific coding rate pattern information according to a receiver algorithm.

Although a resource element is exemplified herein, the aforementioned embodiment may be equally applied to a resource block unit, a bandwidth unit, a symbol unit, a spatial resource unit, or the like.

Although the above embodiment has been exemplified in a state where a Transmission bits/User is fixed, it is also applicable to a case where multiple users have a different Transmission bits/User without having to fix the Transmission bits/User.

Although UE x is represented as a single user in the aforementioned embodiment, it may be replaced with UE group x. Each UE group may represent a set of symbols overlapping in a multi-user overlapping manner.

The above embodiments 1, 2, and 3 operate independently in terms of the entire context, but may be selectively or simultaneously used by being combined in one system. In addition, when the above embodiments 1, 2, and 3 are combined, the embodiments may operate dependently in MUD to optimize performance of multi-user data separation.

Although the above embodiments 1, 2, and 3 have been described in terms of UL, it may also be equally applied to DL.

Figure 30:
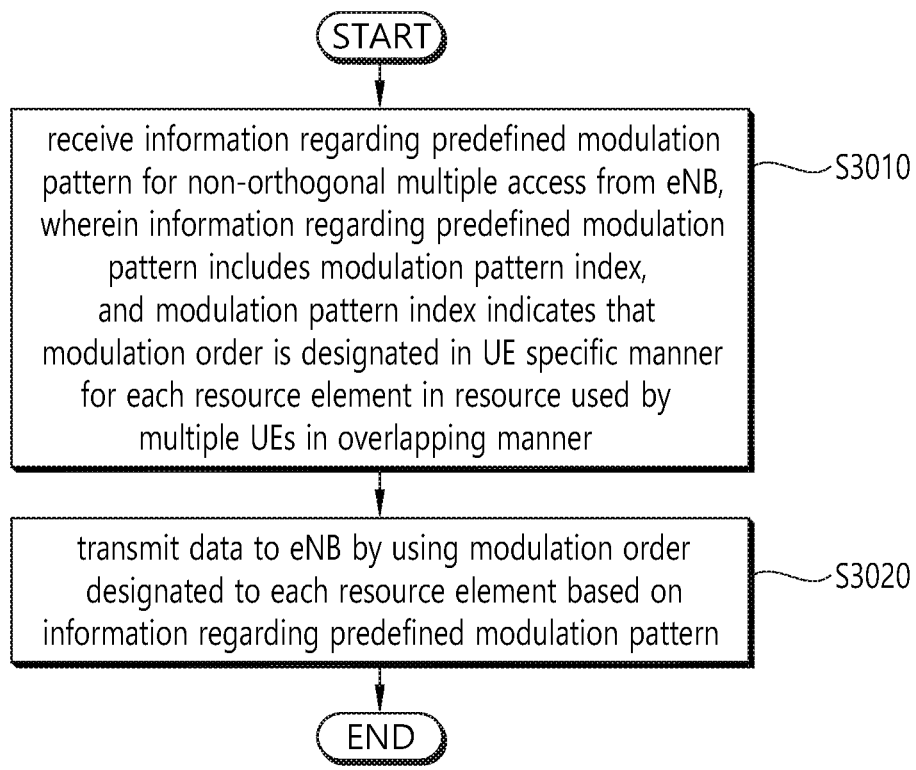
FIG. 30 is a flowchart showing a procedure of transmitting contention-based data by using a predefined modulation pattern or a predefined coding rate pattern according to an embodiment of the present specification.

FIG. 30 is a flowchart showing a procedure of transmitting contention-based data by using a predefined modulation pattern or a predefined coding rate pattern according to an embodiment of the present specification.

In step S3010, a UE receives information regarding a predefined modulation pattern for non-orthogonal multiple access from an eNB. The information regarding the predefined modulation pattern includes a modulation pattern index. The modulation pattern index indicates that a modulation order is designated in a UE-specific manner for each resource element in a resource used by multiple UEs in an overlapping manner.

That is, for each UE, the modulation order is designated with respect to each resource element. In addition, the modulation pattern for each resource element may vary for each modulation pattern index. However, even if the modulation pattern varies for each resource element, data transmitted by the multiple UEs has the same data rate.

In addition, the modulation pattern index may further indicate that a specific resource element in the resource used by the multiple UEs in an overlapping manner is nulled in a UE-specific manner. That is, the nulling of the specific resource element in a modulation pattern for each resource element used for each UE may mean that interference between the UEs can be cancelled by transmitting a null symbol instead of transmitting a modulation symbol in the specific resource element.

An expected value of power and variance value of power with respect to multiuser interference (MUI) of each of the resource elements may vary depending on a modulation order (or modulation pattern) designated for each of the resource elements. The presence of the power variance value for the MUI means that an amount of interference between UEs may not be constant but be variable. Lower reliability may be provided when the amount of interference between UEs is greater than a specific value, and higher reliability may be provided when the amount of interference between UEs is less than the specific value. Accordingly, since high reliability is provided to a high modulation order, reliability for more information bits is provided, thereby increasing reliability of the entire data.

In step S3020, the UE transmits data to the eNB by using the modulation order designated to each of the resource elements on the basis of the information regarding the predefined modulation pattern. The UE may transmit data with a hierarchical modulation order for each resource element in a resource used by the multiple UEs in an overlapping manner.

In addition, the UE may select a modulation pattern index for the UE from the modulation pattern indices. In addition, the eNB may predefine a modulation pattern index for the UE, and may report it through RRC signaling. The data may be modulated by a modulation order designated by each of the resource element indicated by a modulation pattern index for the UE. In addition, the modulation pattern index may be received through a control channel (e.g., PDCCH).

In addition, the UE may receive information regarding a predefined coding rate pattern for the non-orthogonal multiple access from the eNB. The information regarding the predefined coding rate pattern may include a coding rate pattern index. The coding rate pattern index may indicate that a coding rate is designated in a UE-specific manner for each resource element in a resource used by multiple UEs in an overlapping manner.

The UE may select a coding rate pattern index for the UE from the coding rate pattern indices. In addition, the eNB may redefine a coding rate pattern index for the UE, and may report it through RRC signaling. The data may be encoded by a coding rate designated for each of the resource elements indicated by the coding rate pattern index for the UE.

In addition, the UE may receive information regarding a predefined codeword for non-orthogonal multiple access from the eNB. The modulation pattern index may be designated based on an index of the predefined codeword. The coding rate pattern index may be designated based on the index of the predefined codeword. That is, the codeword index may be predefined by being tied to a UE-specific modulation pattern index or a coding rate pattern index. Therefore, the eNB may verify a modulation pattern or a coding rate pattern on the basis of a codeword index when performing blind detection.

In addition, information regarding the predefined modulation pattern and information regarding the predefined coding rate pattern may be broadcast to all UEs in a cell in a look-up table manner.

In addition, the aforementioned UE may be a single UE or may be a UE group including a plurality of UEs. In addition, a resource supported by multiple UEs in an overlapping manner may have a self-contained subframe structure. In this case, a symbol for reference signal transmission for each UE group may be allocated not to overlap for each UE group in a time domain.

Specifically, the eNB may configure a UE group from a highest group to a lowest group by considering a data rate required by each UE, scheduling fairness between the UEs, a timing distance of each UE, or the like. When the eNB allocates a symbol for reference symbol transmission to a specific time domain for a specific higher group, a null symbol may be allocated for a lower group than the specific higher group. Therefore, the eNB may allocate the maximum number of data symbols to the highest group, and may allocate the minimum number of data symbols to the lowest group.

Figure 31:
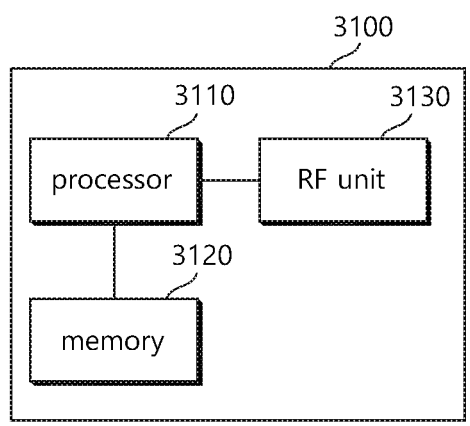
FIG. 31 is a block diagram showing an apparatus for wireless communication for implementing an embodiment of the present invention.

FIG. 31 is a block diagram showing an apparatus for wireless communication for implementing an embodiment of the present invention.

An apparatus 3100 for wireless communication includes a processor 3110, a memory 3120 and a radio frequency (RF) unit 3130.

The processor 3110 may be configured to implement proposed functions, procedures and/or methods described in this description. Layers of the radio interface protocol may be implemented in the processor 3110. The processor 3110 may handle a procedure explained above. The memory 3120 is operatively coupled with the processor 3110, and the RF unit 3130 is operatively coupled with the processor 3110.

The processor 3110 may include application-specific integrated circuit (ASIC), other chipset, logic circuit and/or data processing device. The memory 3120 may include read-only memory (ROM), random access memory (RAM), flash memory, memory card, storage medium and/or other storage device. The RF unit 3130 may include baseband circuitry to process radio frequency signals. When the embodiments are implemented in software, the techniques described herein can be implemented with modules (e.g., procedures, functions, and so on) that perform the functions described herein. The modules can be stored in memory 3120 and executed by processor 3110. The memory 3120 can be implemented within the processor 3110 or external to the processor 3110 in which case those can be communicatively coupled to the processor 3110 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of transmitting contention-based data by a user equipment (UE), among multiple UEs in a wireless communication system, the method comprising:
receiving, from a base station, information on a predefined modulation pattern for a non-orthogonal multiple access scheme,
wherein the information on the predefined modulation pattern includes modulation pattern indices,
selecting a modulation pattern index for the UE from the modulation pattern indices; and
transmitting data to the base station through a resource allocated to the multiple UEs based on the selected modulation pattern index,
wherein the resource is overlapped in a time domain and a frequency domain for the multiple UEs based on the non-orthogonal multiple access scheme and includes a plurality of resource elements, wherein the selected modulation pattern index includes information on a modulation order for the plurality of resource elements for the UE, wherein the data is modulated by the modulation order for the plurality of resource elements for the UE and is transmitted through the plurality of resource elements, wherein a modulation order for the plurality of resource elements for the multiple UEs varies in a UE-specific manner, and wherein all data transmitted by the multiple UEs through the plurality of resource elements have a same data rate.

2. The method of claim 1, wherein the selected modulation pattern index further includes information on that that a specific resource element in the resource is nulled in a UE-specific manner.

3. The method of claim 1, wherein the selected modulation pattern index is pre-determined between the base station and the UE and is received through radio resource control (RRC) signaling.

4. The method of claim 1, further comprising:
receiving information on a predefined coding rate pattern for the non-orthogonal multiple access scheme from the base station,
wherein the information on the predefined coding rate pattern includes coding rate pattern indices, and the coding rate pattern indices include information on that a coding rate is designated in a UE-specific manner for each resource element in a resource used by multiple UEs in an overlapping manner; and
selecting a coding rate pattern index for the UE from the coding rate pattern indices,
wherein the data is encoded by a coding rate designated for each of the resource elements indicated by the selected coding rate pattern index.

5. The method of claim 4, further comprising
receiving information on a predefined codeword for the non-orthogonal multiple access scheme from the base station,
wherein the selected modulation pattern index is designated based on an index of the predefined codeword, and
wherein the selected coding rate pattern index is designated based on the index of the predefined codeword.

6. A user equipment (UE) in a wireless communication system, the UE comprising:
a transceiver transmitting and receiving a radio signal; and
a processor operatively coupled to the transceiver,
wherein the processor is configured to:
receive, from a base station, information on a predefined modulation pattern for a non-orthogonal multiple access scheme,
wherein the information on the predefined modulation pattern includes modulation pattern indices;
select a modulation pattern index for the UE from the modulation pattern indices; and
transmit data to the base station through a resource allocated to the multiple UEs based on the selected modulation pattern index,
wherein the resource is overlapped in a time domain and a frequency domain for the multiple UEs based on the non-orthogonal multiple access scheme and includes a plurality of resource elements,
wherein the selected modulation pattern index includes information on a modulation order for the plurality of resource elements for the UE,
wherein the data is modulated by the modulation order for the plurality of resource elements for the UE and is transmitted through the plurality of resource elements,
wherein a modulation order for the plurality of resource elements for the multiple UEs varies in a UE-specific manner, and
wherein all data transmitted by the multiple UEs through the plurality of resource elements have a same data rate.

7. The UE of claim 6, wherein the selected modulation pattern index further includes information on that that a specific resource element by the multiple UEs is nulled in a UE-specific manner.

8. The UE of claim 6, wherein the selected modulation pattern index is pre-determined between the base station and the UE and is received through radio resource control (RRC) signaling.

9. The UE of claim 6, wherein the processor is configured to:
receive information on a predefined coding rate pattern for the non-orthogonal multiple access scheme from the base station,
wherein the information on the predefined coding rate pattern includes coding rate pattern indices, and the coding rate pattern indices include information on that a coding rate is designated in a UE-specific manner for each resource element in a resource used by multiple UEs in an overlapping manner; and
select a coding rate pattern index for the UE from the coding rate pattern indices,
wherein the data is encoded by a coding rate designated for each of the resource elements indicated by the selected coding rate pattern index.

10. The UE of claim 9, wherein the processor is configured to
receive information on a predefined codeword for the non-orthogonal multiple access scheme from the base station,
wherein the selected modulation pattern index is designated based on an index of the predefined codeword, and
wherein the selected coding rate pattern index is designated based on the index of the predefined codeword.

* * * * *